(12) United States Patent
Sakamoto

(10) Patent No.: US 8,884,868 B2
(45) Date of Patent: Nov. 11, 2014

(54) DISPLAY DEVICE AND MANUFACTURING METHOD THEREOF

(75) Inventor: Michiaki Sakamoto, Kawasaki (JP)

(73) Assignee: NLT Technologies, Ltd., Kanagawa (JP)

( * ) Notice: Subject to any disclaimer, the term of this patent is extended or adjusted under 35 U.S.C. 154(b) by 1060 days.

(21) Appl. No.: 12/540,706

(22) Filed: Aug. 13, 2009

(65) Prior Publication Data

US 2010/0039354 A1    Feb. 18, 2010

(30) Foreign Application Priority Data

Aug. 18, 2008 (JP) ................................. 2008-210095

(51) Int. Cl.
| | | |
|---|---|---|
| G09G 3/34 | (2006.01) | |
| G02F 1/167 | (2006.01) | |
| G02F 1/1362 | (2006.01) | |
| G02F 1/1335 | (2006.01) | |

(52) U.S. Cl.
CPC ............ *G02F 1/167* (2013.01); *G02F 2202/28* (2013.01); *G02F 2001/136218* (2013.01); *G02F 1/136204* (2013.01); *G02F 2001/1676* (2013.01); *G02F 1/133514* (2013.01)
USPC .......................................... 345/107; 345/55

(58) Field of Classification Search
CPC ............... G02F 1/136204; G02F 2001/136218
USPC .............................................. 345/107, 60–92
See application file for complete search history.

(56) References Cited

U.S. PATENT DOCUMENTS

| | | | |
|---|---|---|---|
| 7,190,008 B2 | 3/2007 | Amundson et al. | |
| 2002/0033792 A1* | 3/2002 | Inoue | 345/107 |
| 2004/0142118 A1* | 7/2004 | Takechi | 428/1.6 |
| 2005/0206813 A1* | 9/2005 | Kodama | 349/108 |
| 2007/0013649 A1* | 1/2007 | Kim et al. | 345/107 |
| 2007/0207571 A1* | 9/2007 | Morisue et al. | 438/107 |
| 2007/0295973 A1* | 12/2007 | Jinbo et al. | 257/88 |
| 2008/0043318 A1* | 2/2008 | Whitesides et al. | 359/296 |
| 2008/0100566 A1 | 5/2008 | Miyasaka et al. | |

FOREIGN PATENT DOCUMENTS

| | | |
|---|---|---|
| CN | 101169567 A | 4/2008 |
| JP | 10-206872 A | 8/1998 |

(Continued)

OTHER PUBLICATIONS

Japanese Office Action dated Jun. 5, 2013 issued in corresponding Japanese Patent Application No. 2008-210095.

(Continued)

*Primary Examiner* — Viet Pham
(74) *Attorney, Agent, or Firm* — Sughrue Mion, PLLC

(57) ABSTRACT

A display panel which can be applied to a display device comprises a first substrate, a second substrate and a display element layer. The first substrate has a structure in which a device layer is stacked on an insulating substrate via a first conductive layer. A device layer has at least, a pixel electrode and a wiring that are connected to a pixel switch. The second substrate includes a second conductive layer that is provided so as to face the pixel electrode arranged on the above first substrate. A display element layer is interposed between the above first substrate and the above second substrate.

12 Claims, 20 Drawing Sheets

(56) References Cited

FOREIGN PATENT DOCUMENTS

| | | |
|---|---|---|
| JP | 10-268342 A | 10/1998 |
| JP | 11-052403 A | 2/1999 |
| JP | 2001-242805 A | 9/2001 |
| JP | 2003-280050 A | 10/2003 |
| JP | 2004-219551 A | 8/2004 |
| JP | 2005-208348 A | 8/2005 |
| JP | 2005-292420 A | 10/2005 |
| WO | WO 02/084739 A1 | 10/2002 |

OTHER PUBLICATIONS

Chinese Office Action issued Jun. 4, 2012 in corresponding Chinese Patent Application No. 200910163746.3.

* cited by examiner

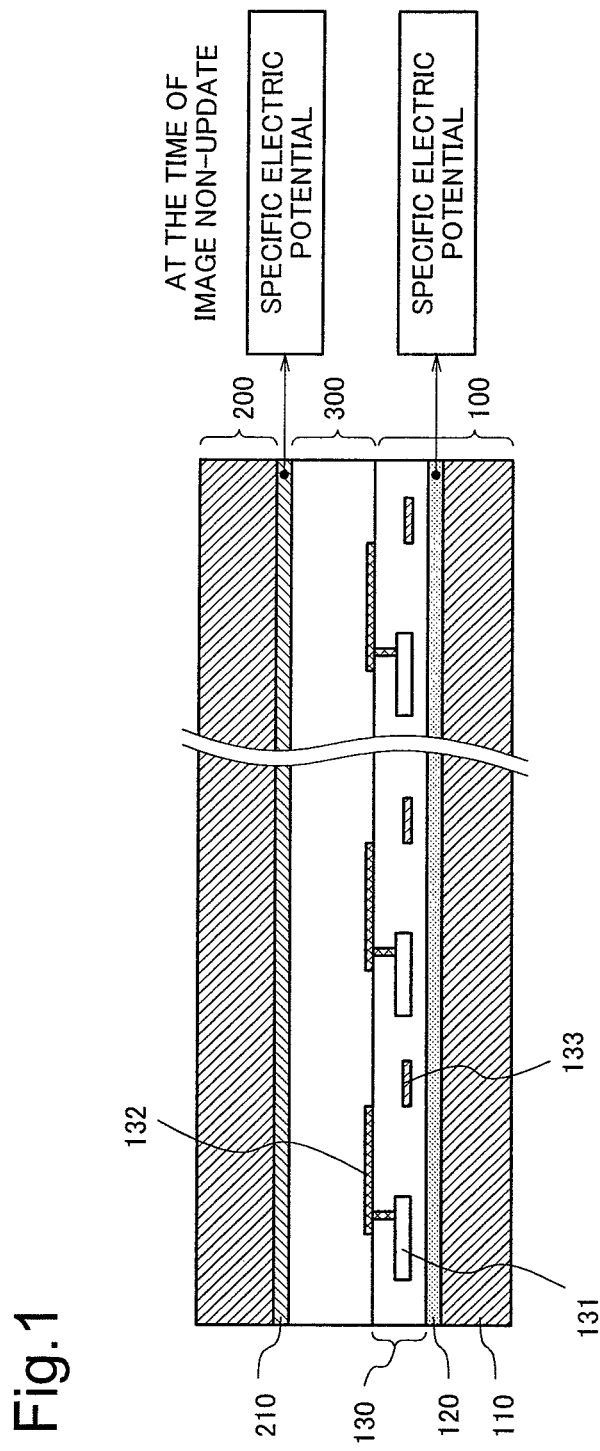

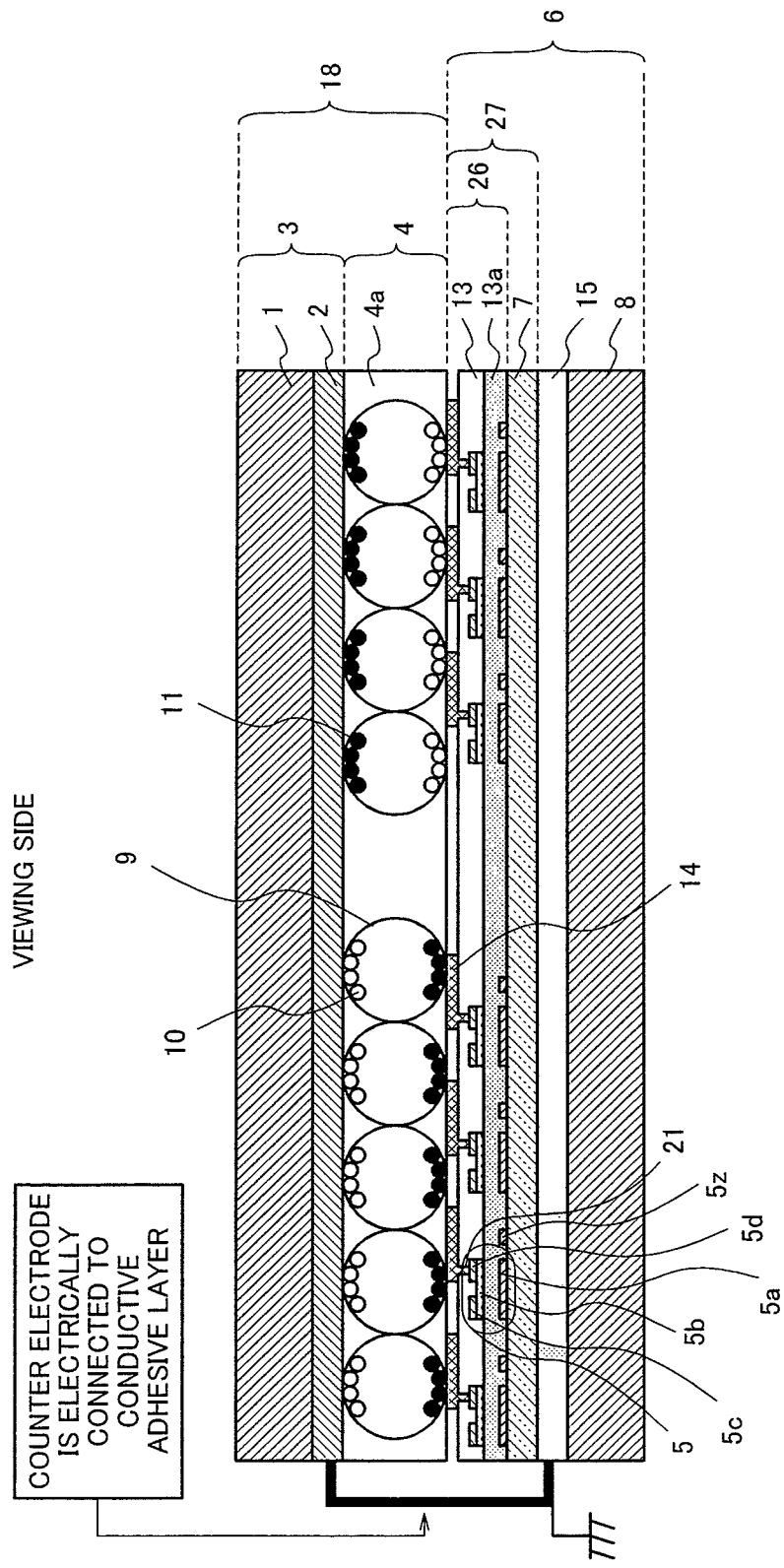

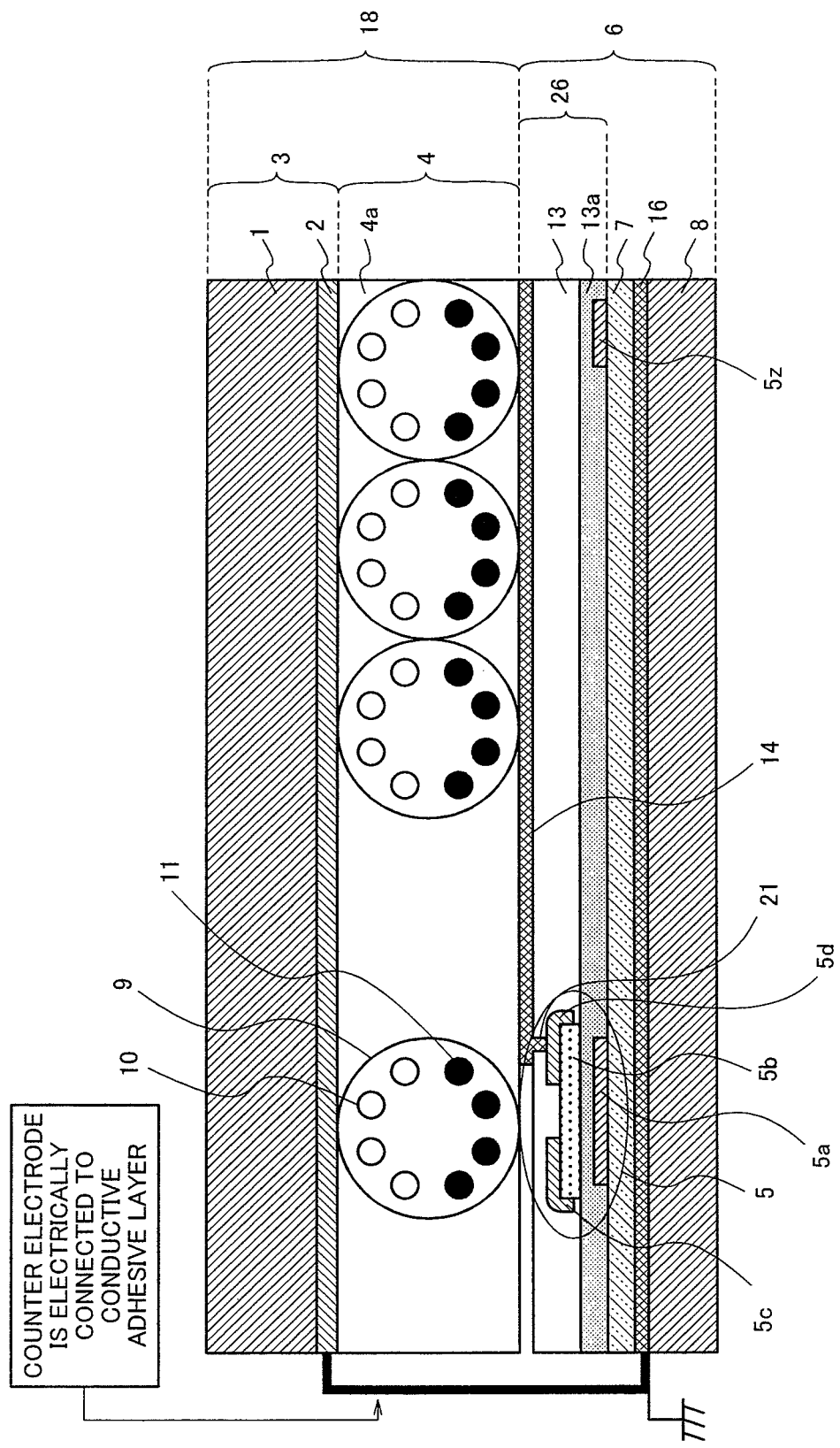

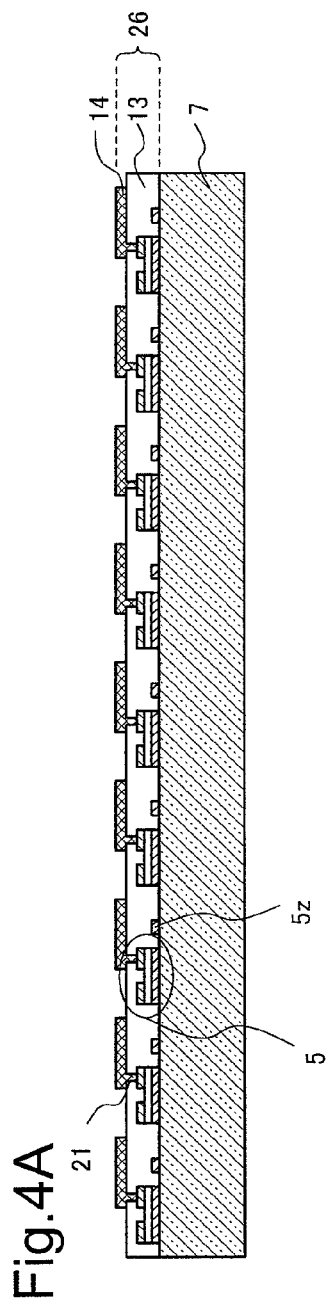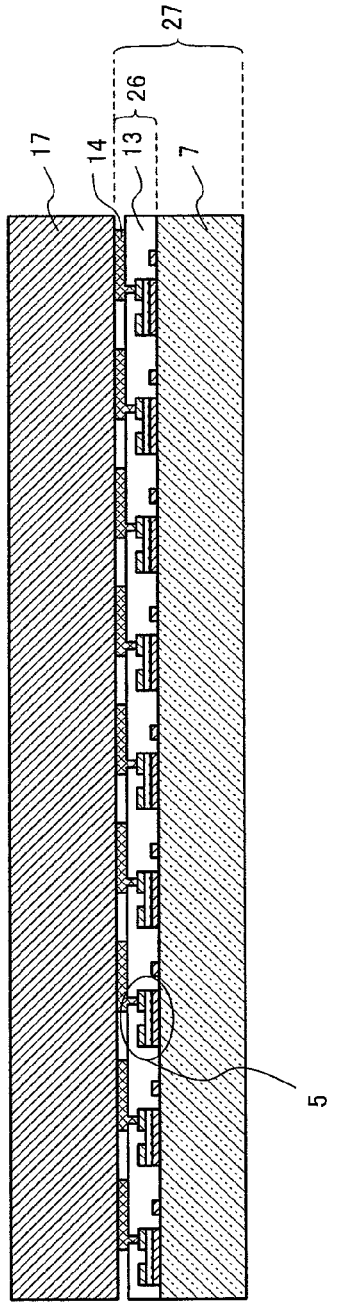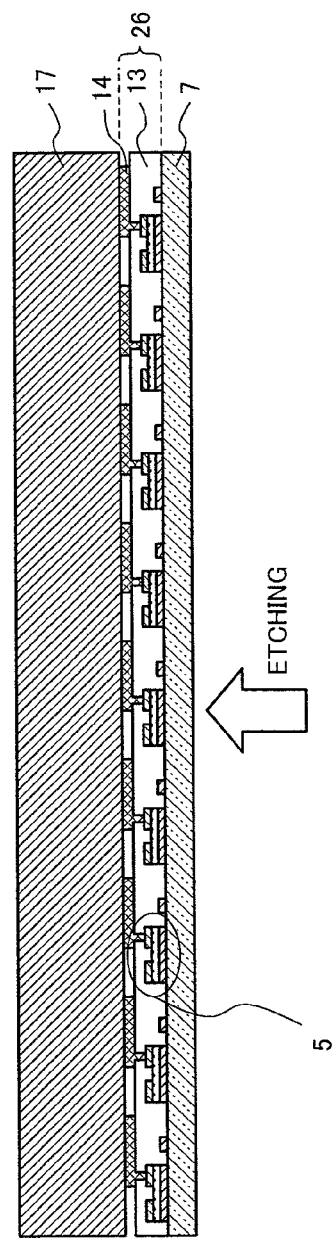
Fig.4A
Fig.4B
Fig.4C

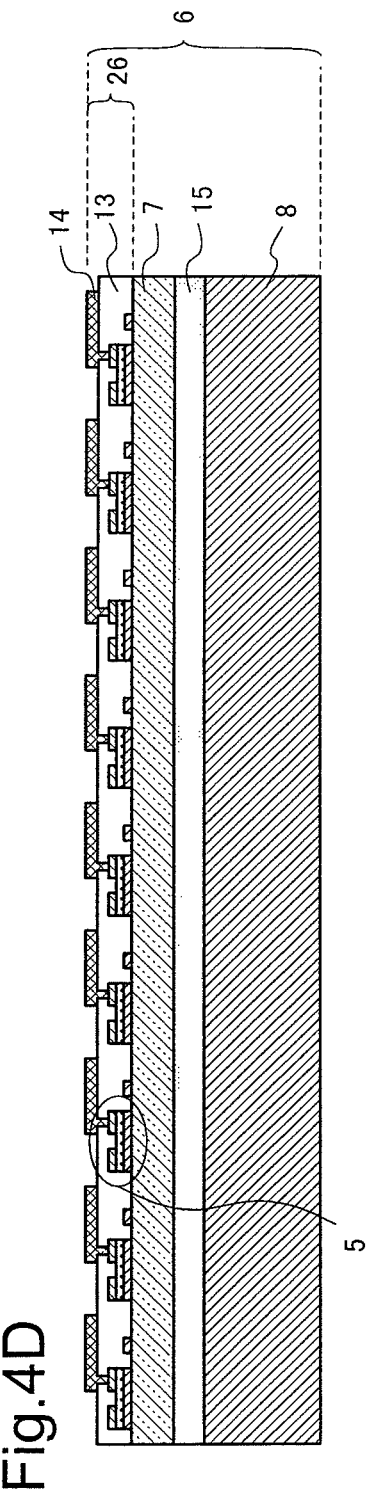
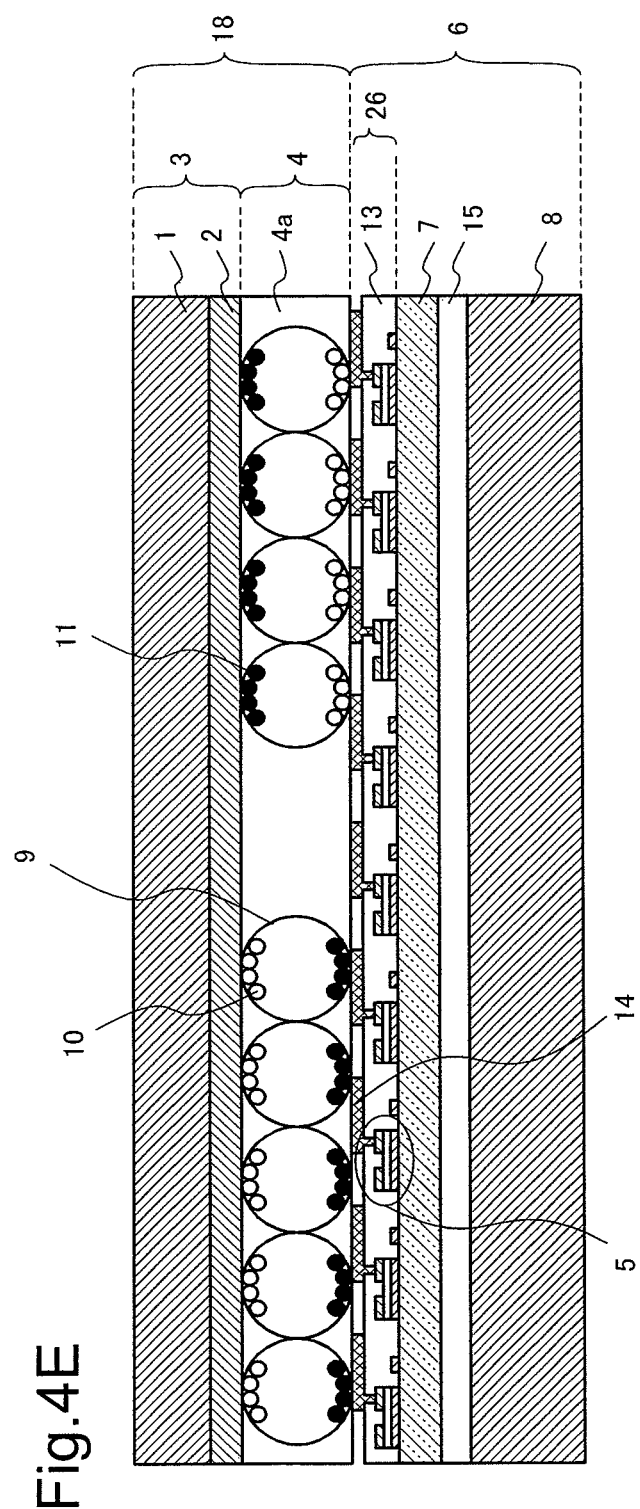
Fig.4D
Fig.4E

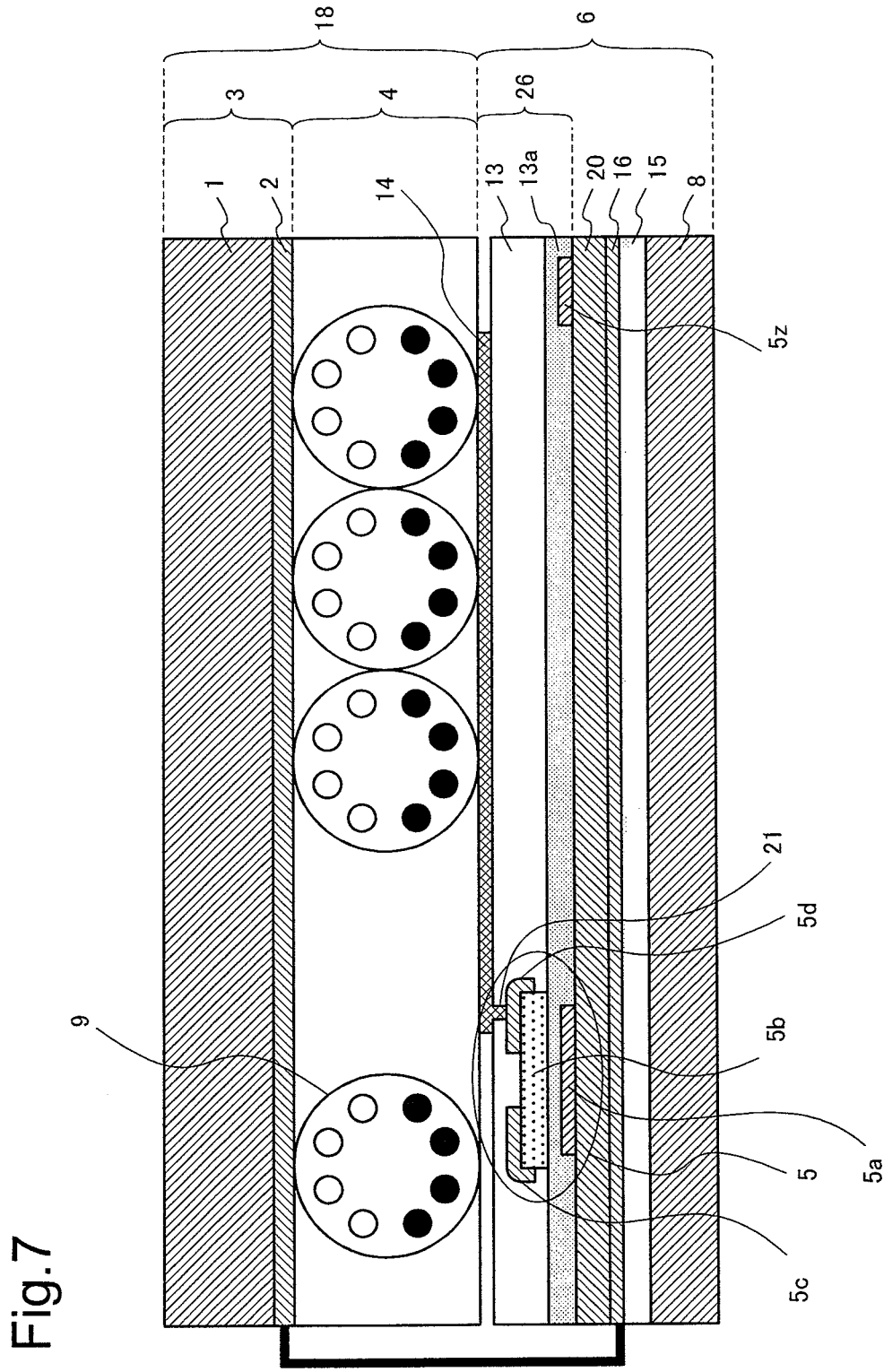

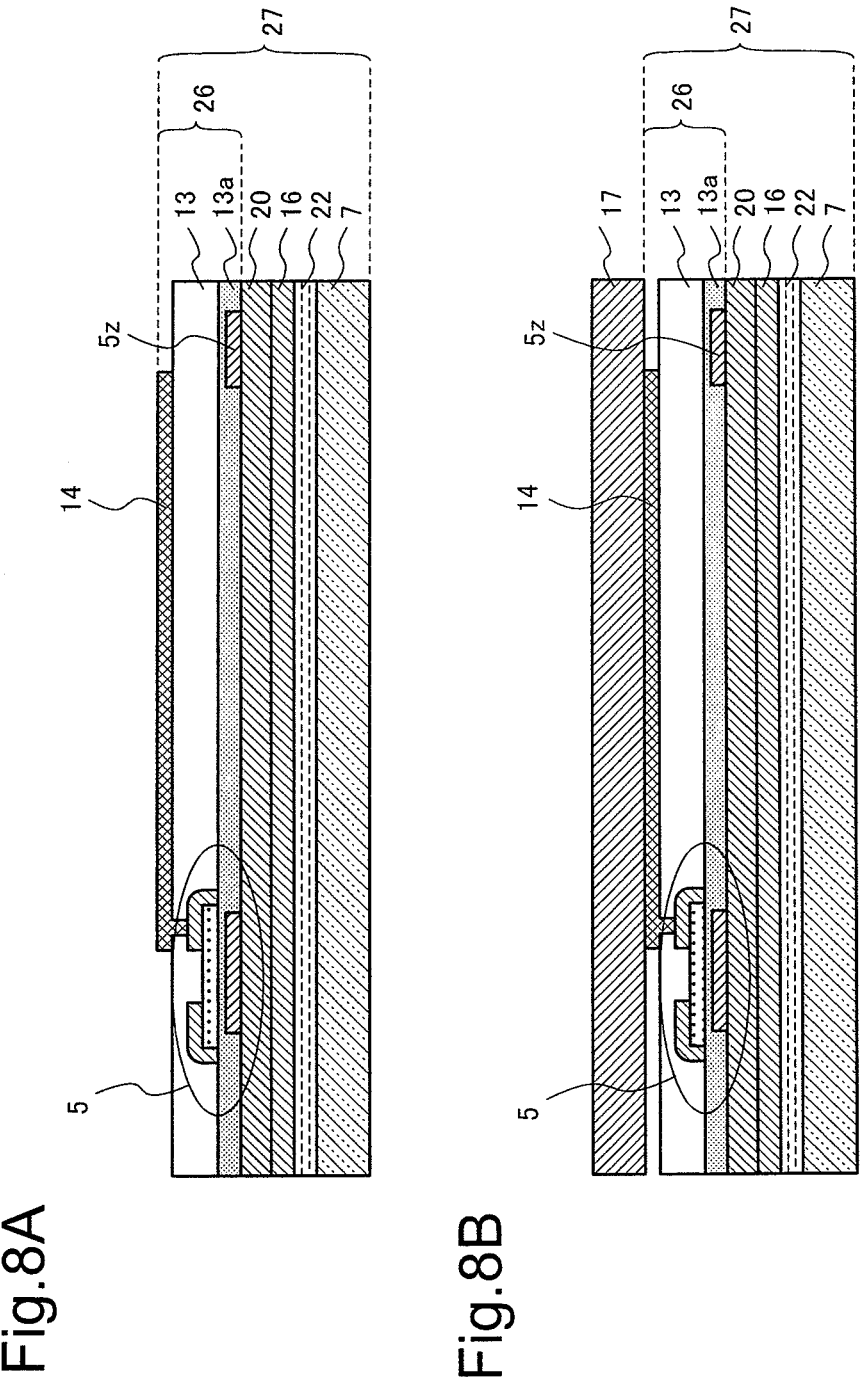

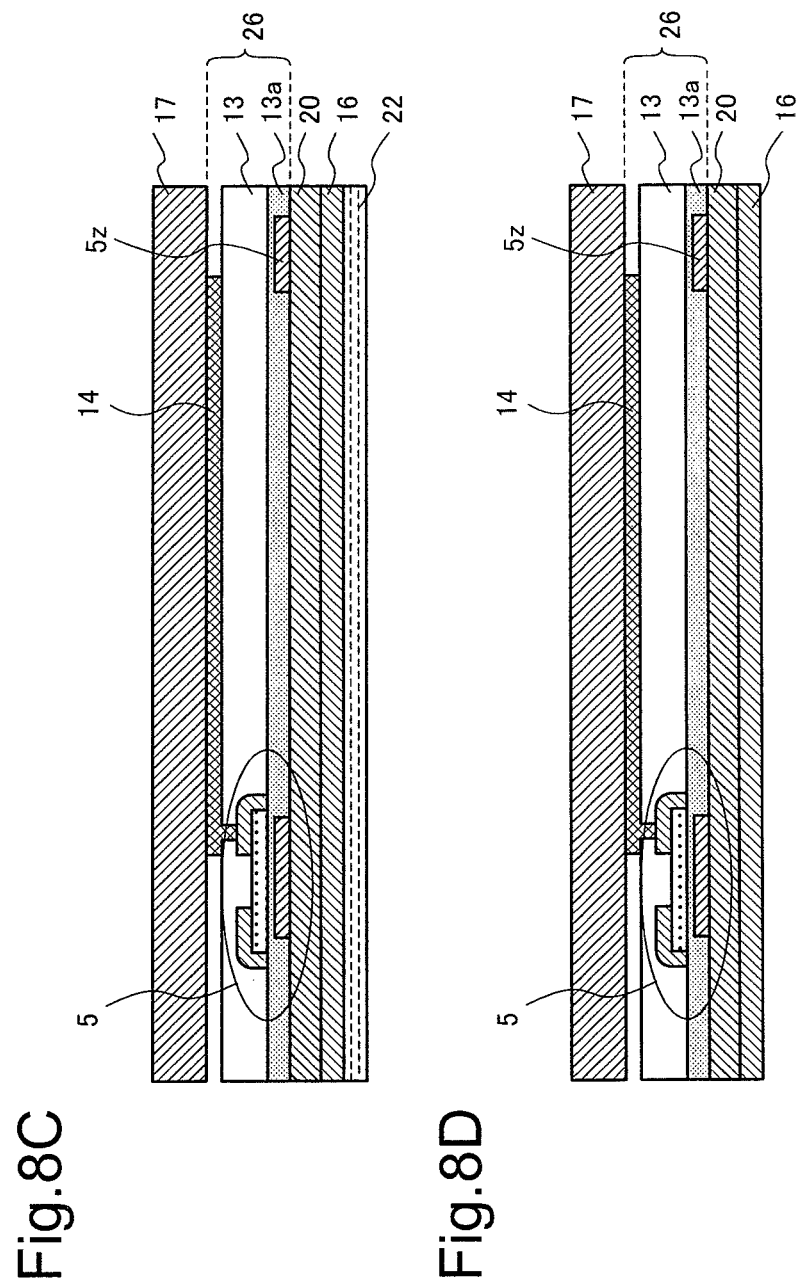

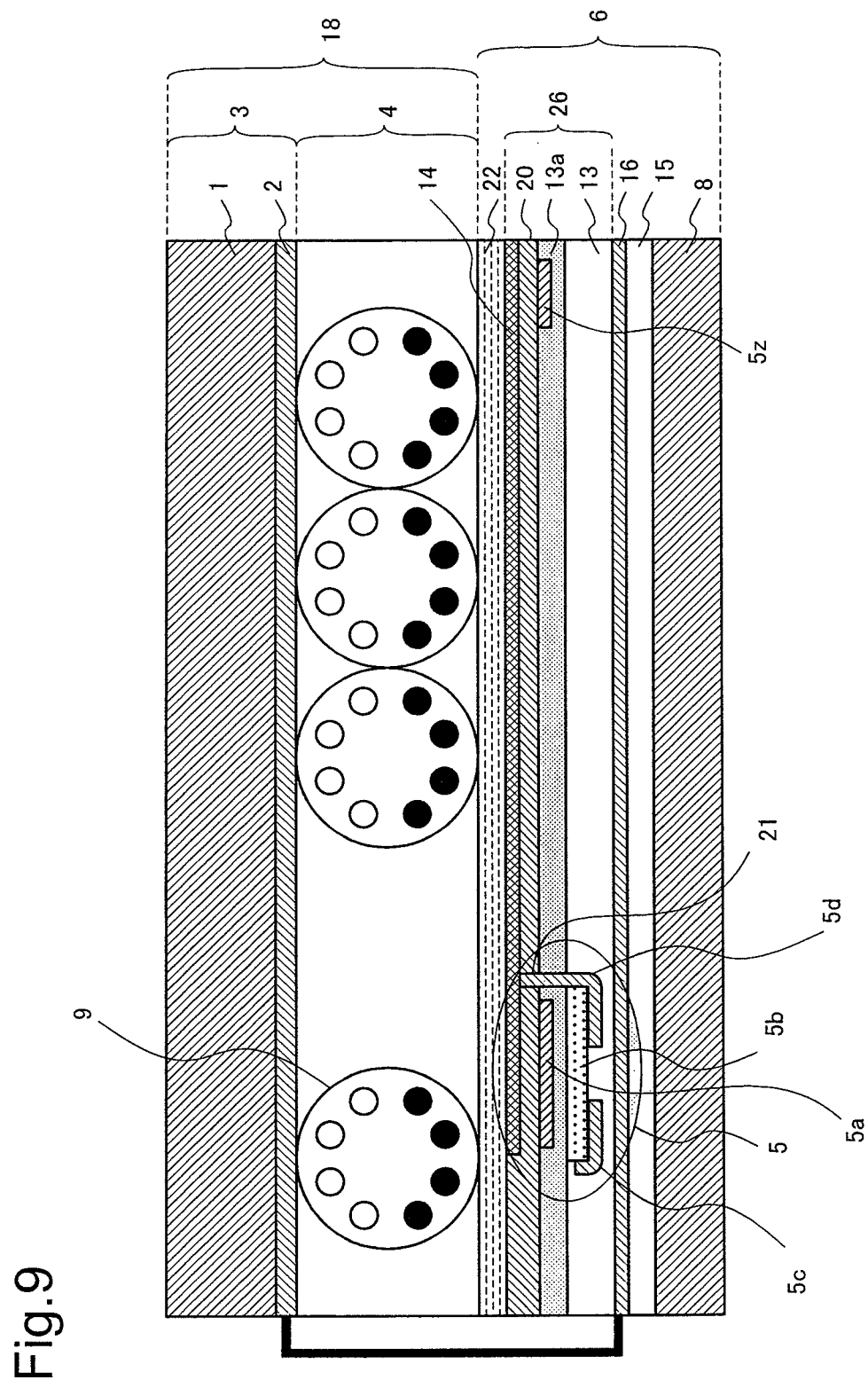

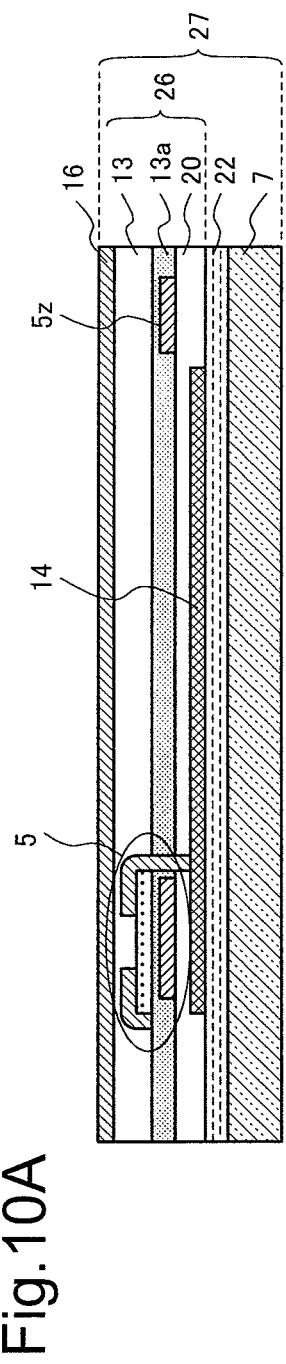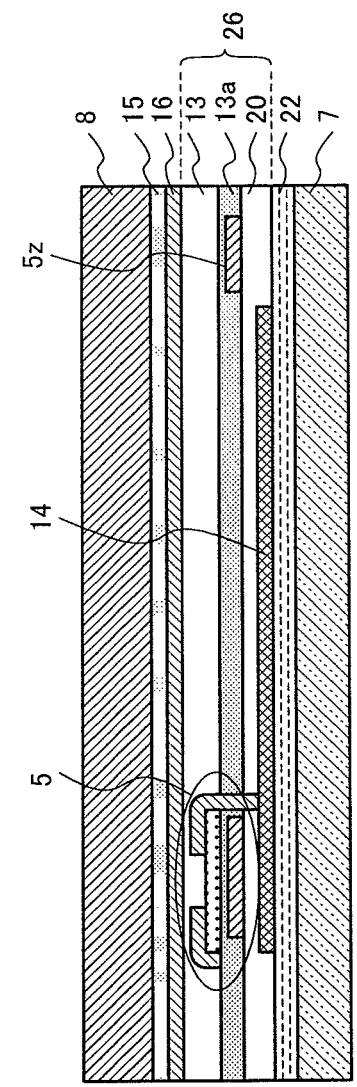
Fig.10A
Fig.10B

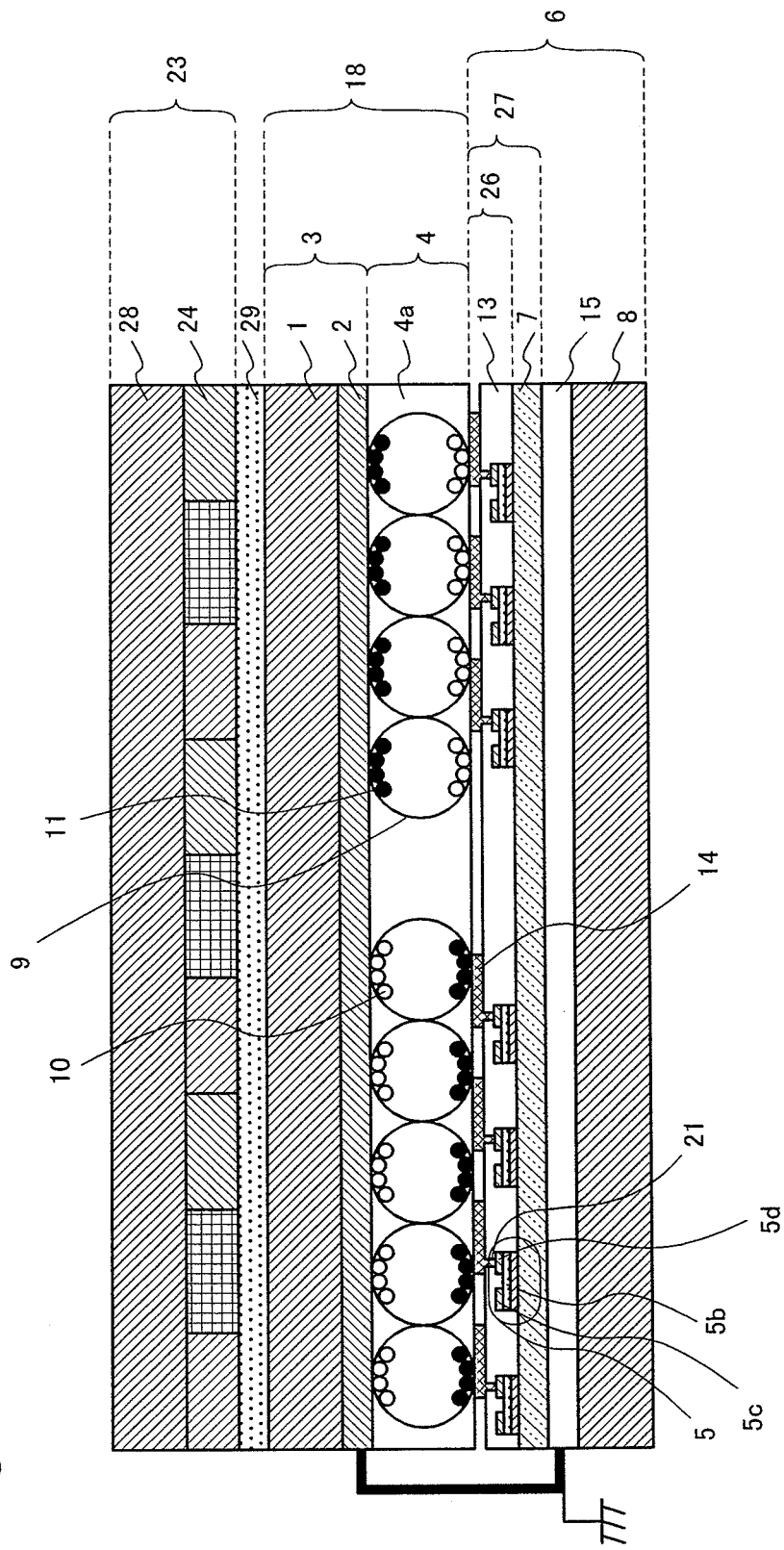

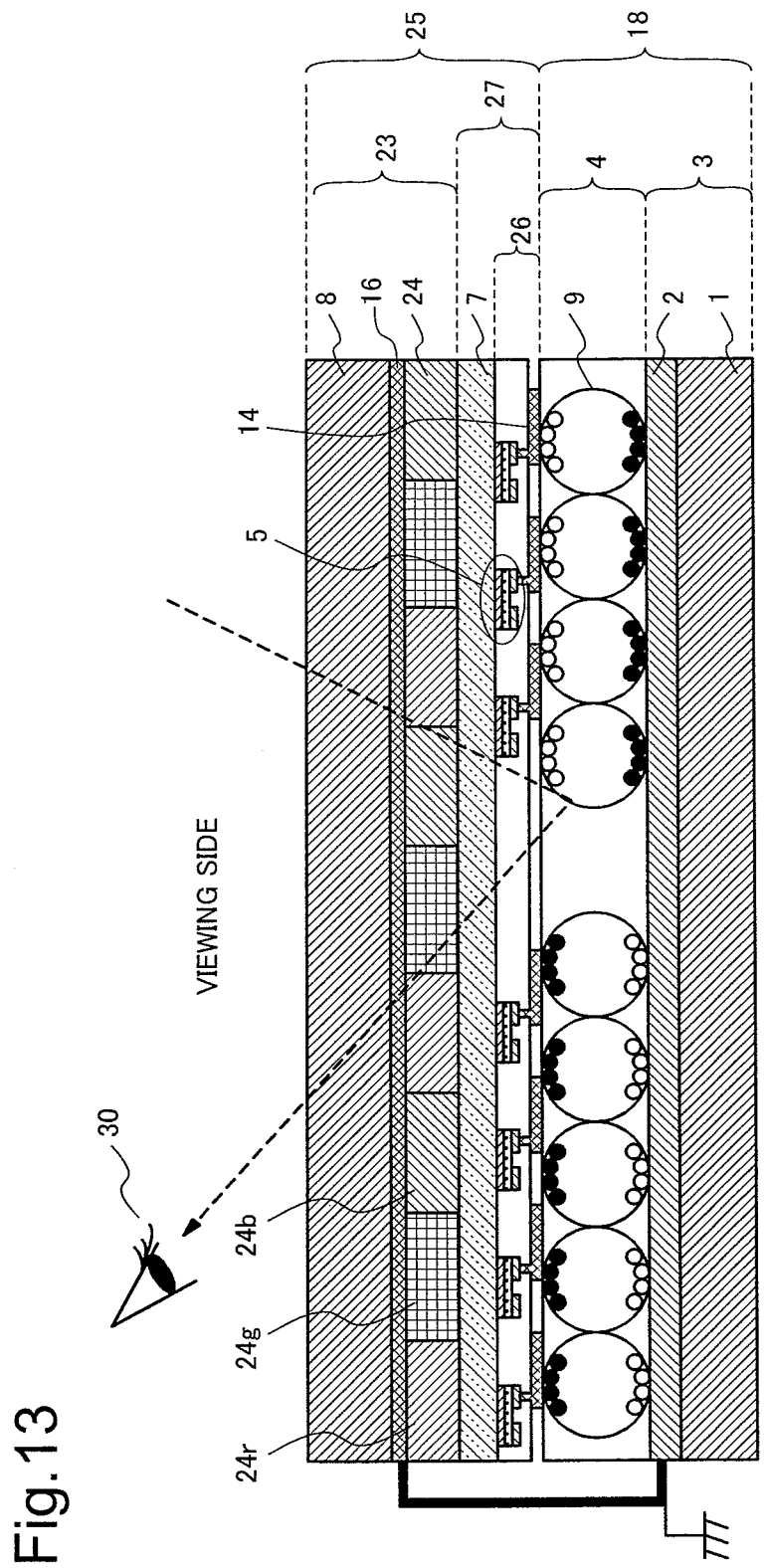

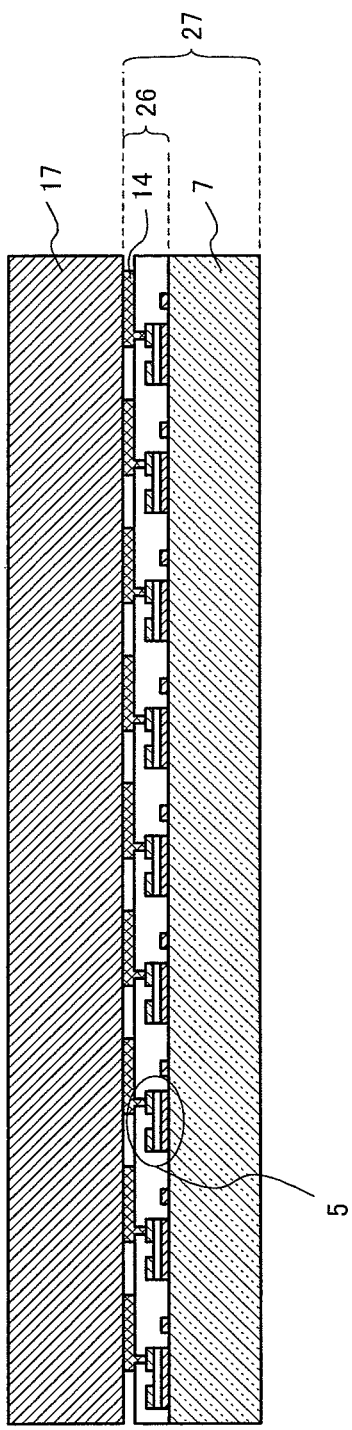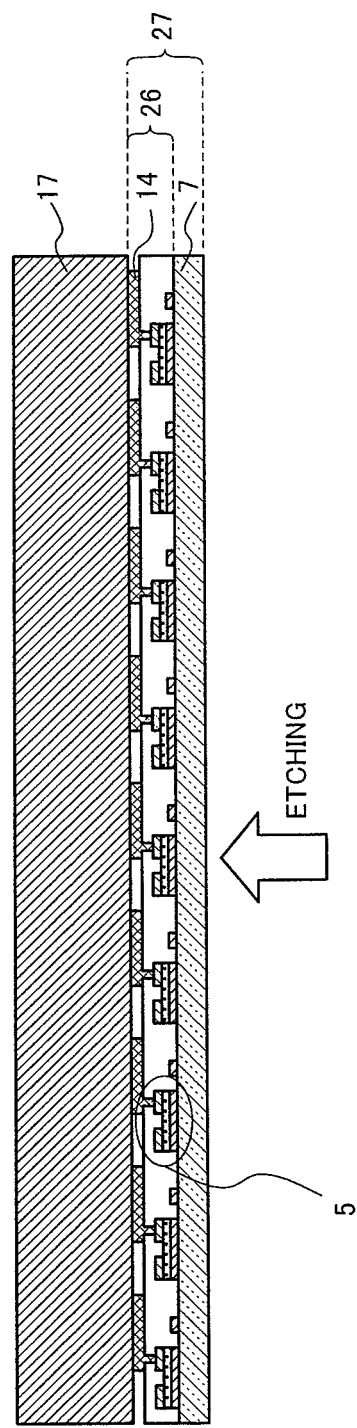

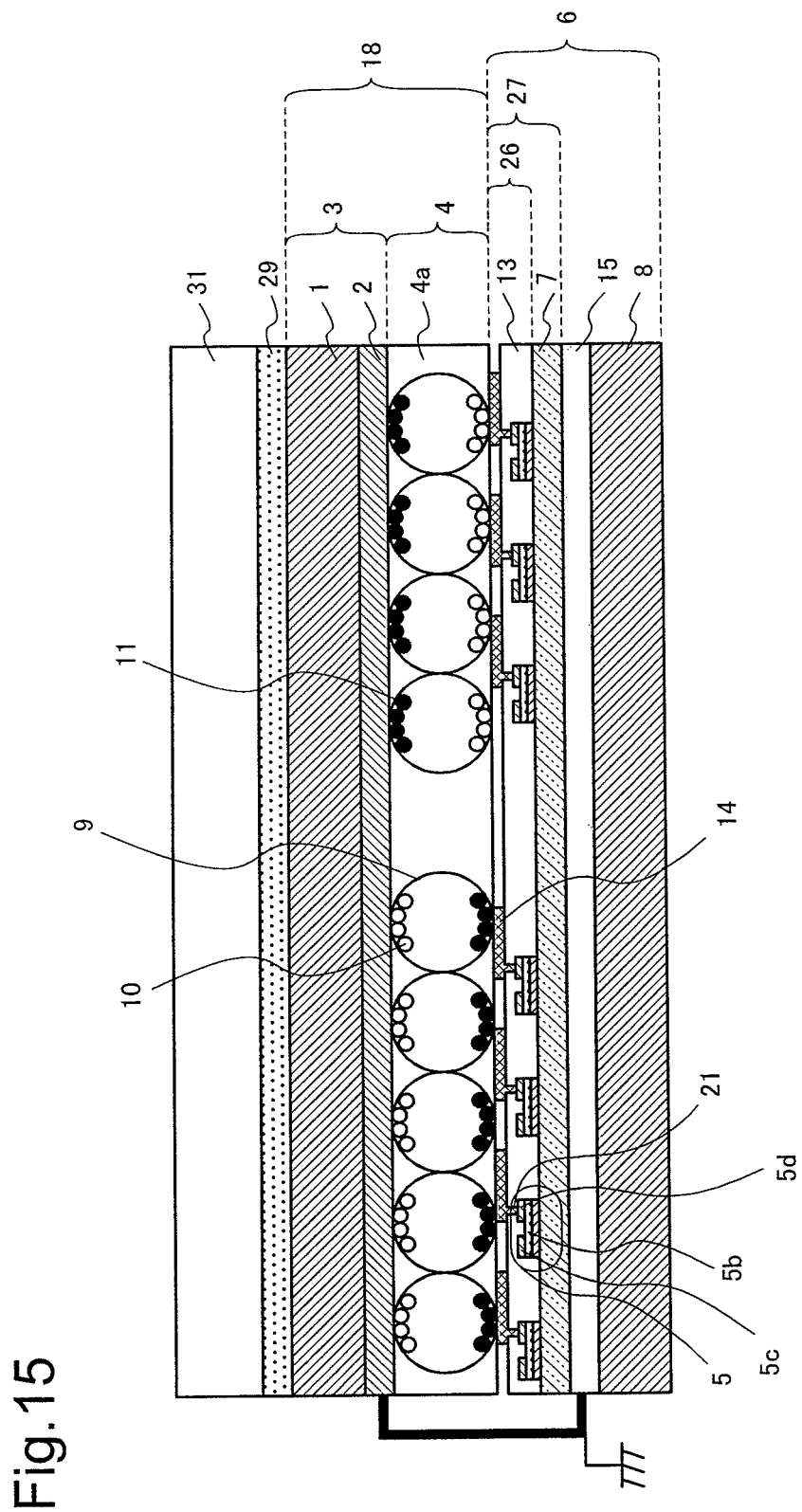

DISPLAY DEVICE AND MANUFACTURING METHOD THEREOF

This application is based upon and claims the benefit of priority from Japanese patent application No. 2008-210095, filed on Aug. 18, 2008 the disclosure of which is incorporated herein in its entirety by reference.

TECHNICAL FIELD

This invention relates to a display device with a memory capability such as an electronic paper display device or the like and a manufacturing method thereof.

BACKGROUND ART

In recent years, an electronic paper display device that is a display device with a memory capability has been developed as a display device such that which "reading" can be realized with no stress such as an electronic book, an electronic newspaper or the like. Here, the "display device with a memory capability" means a display device which has two or more different stable states and of which the two or more different stable states can be electrically switched and those states have different optical properties. Such display device is also called as "bistable display device". The image display state in the bistable display device includes an image update state in which an update image is written and an image non-update state in which an update image is not written. Here, because the bistable display device can hold the image displayed on the display device without supplying electrical power when it is in the image non-update state, the power consumption thereof can be reduced.

In particular, the above-mentioned electronic paper display device has a memory capability that is the feature of the bistable display device mentioned above and additionally, it is requested to be thin, lightweight, resistant to cracking and easy to read like a printed paper. Additionally and preferably, it is desired that the display panel of the electronic paper display device is flexible (bendable) and can perform a color display. As an example of the display device with a memory capability, the microcapsule type electrophoresis display device developed by an American company (E Ink Corporation) is known.

With respect to such electrophoresis display device, a structure in which a microcapsule type electrophoresis display element is driven by a switching element is disclosed in a patent document, for example, U.S. patent application number 2005/0078099 (hereinafter, referred to as patent document 1). The electrophoresis display device disclosed in patent document 1 includes a flexible base substrate, a nonlinear switching element, a pixel electrode connected to the switching element, a microcapsule type electrophoresis display element and a common electrode.

Here, the flexible base substrate is composed of materials such as a stainless steel or a metal foil, polyimide and the like and can be bent. The nonlinear switching element is provided on one surface side of the above-mentioned base substrate. The pixel electrode is connected to the switching element via a planarized film. The microcapsule type electrophoresis display element is arranged on one surface side of the base substrate. The common electrode is provided so as to face the pixel electrode via the microcapsule type electrophoresis display element.

A method for forming the nonlinear element on the flexible substrate in such panel structure is disclosed in for example, Japanese Patent Application Laid-Open No. 2004-219551 (hereinafter, referred to as patent document 2) and Japanese Patent Application Laid-Open No. 2005-292420 (hereinafter, referred to as patent document 3). A method with which the nonlinear element is formed on one surface side of a glass layer, another surface side (rear side) of the glass layer is thinly etched so that the thickness of the glass layer becomes smaller than or equal to 200 μm and a flexible film is pasted on the another surface side of the etched glass layer is disclosed in patent document 2.

A method with which an optical element and a thin film transistor device are transferred and stacked on a long thin film made of an organic resin by a roll to roll process is disclosed in patent document 3.

A plastic substrate such as polyimide, polyethylene terephthalate (PET) or the like other than the stainless steel and the metal foil mentioned above can be used for the flexible substrate disclosed in patent document 1 to 3. Here, the plastic substrate has characteristics in which charge-up (charging) of the surface easily occurs by static electricity or the like in comparison with a conductive substrate such as the stainless steel, the metal foil or the like.

Therefore, it is known that in the display device with a memory capability like the electronic paper display device, when static electricity is generated on the surface of the plastic substrate at the time of image non-update state mentioned above, the electric field induced by this static electricity causes disturbance of an image or deterioration in image quality. That is because an electrophoresis particle moves in a microcapsule by the electric field induced by the static electricity and the image changes from the image in a state in which a display operation has been just finished (at the start of the image non-update state).

A method for preventing charge up of the surface of the plastic substrate is disclosed in for example, Japanese Patent Application Laid-Open No. 2005-208348 (hereinafter, referred to as patent document 4). A structure in which in the electronic paper display device, a transparent electrode film (a first conductive film) formed on a first substrate is electrically connected to an electrode film (a second conductive film) formed on a second substrate that is opposed to the first substrate via the microcapsule is disclosed in patent document 4. Here, the first substrate is provided on a side on which information is displayed by a display element (that is, a viewing side). By using such structure, the charge up of the surface of the plastic substrate used for the first and second substrates can be prevented, and the problem of disturbance of an image or deterioration in image quality at the time of the image non-update state can be solved.

SUMMARY

In view of the above-mentioned circumstances, the exemplary object of the present invention is to solve the problem described in the background art. Namely, the exemplary object of the present invention is to provide an active matrix type display device with a memory capability and excellent reliability, in which disturbance of an image or deterioration in image quality does not occur at the time of image non-update state even when the display panel is configured by using an insulating substrate having flexibility and a manufacturing method thereof.

A display device of an exemplary aspect of the present invention comprises a first substrate having a device layer which is stacked on an insulating substrate via a first conductive layer and on which a pixel electrode and a wiring that are connected to a pixel switch are arranged so as to correspond to a plurality of display pixels, a second substrate in which a second conductive layer is provided so as to face the pixel electrode arranged on the first substrate, and a display element layer provided between the first substrate and the second substrate, wherein a specific electric potential is applied to said first conductive layer and said second conductive layer at the time of image non-update.

A method for manufacturing a first display device of the present invention includes: providing a film on the device layer formed on one surface side of the glass substrate, etching another surface side of the glass substrate, providing an insulating substrate on the another surface side of the etched glass substrate by using a conductive adhesive material, and peeling off the film from the device layer.

A method for manufacturing a second display device of an exemplary aspect of the present invention includes: providing a film on the device layer formed on one surface side of the glass substrate via an etching stopper layer and a conductive layer, removing the glass substrate completely by etching to expose the etching stopper layer, removing the etching stopper layer completely by etching to expose the conductive layer, providing an insulating substrate on the surface of the exposed conductive layer by using the conductive adhesive material, and peeling off the film from the device layer.

A method for manufacturing a third display device of an exemplary aspect of the present invention includes: forming a device layer that is formed in one surface side of the glass substrate via the etching stopper layer, forming a conductive layer on the device layer, forming the insulating substrate on the surface of the conductive layer by using the conductive adhesive material, and removing the glass substrate completely by etching to expose the etching stopper layer.

A method for manufacturing a fourth display device of an exemplary aspect of the present invention includes: providing a film on the device layer formed on one surface side of the glass substrate, etching another surface side of the glass substrate, providing a color filter and an insulating substrate on the another surface side of the etched glass substrate by using a conductive adhesive material, and peeling off the film from the device layer.

BRIEF DESCRIPTION OF THE DRAWINGS

Exemplary features and advantages of the present invention will become apparent from the following detailed description when taken with the accompanying drawings in which:

FIG. 1 is a schematic cross sectional view of a first exemplary embodiment of a display device according to the present invention.

FIG. 2 is a schematic cross sectional view showing a first structural example of a display panel according to a second exemplary embodiment.

FIG. 3 is a schematic cross sectional view showing a second structural example of a display panel according to the second exemplary embodiment.

FIG. 4A is a cross sectional view illustrating an example of a first step of a method for manufacturing the display panel according to the second exemplary embodiment.

FIG. 4B is a cross sectional view illustrating an example of a second step of the method for manufacturing the display panel according to the second exemplary embodiment.

FIG. 4C is a cross sectional view illustrating an example of a third step of the method for manufacturing the display panel according to the second exemplary embodiment.

FIG. 4D is a cross sectional view illustrating an example of a fourth step of the method for manufacturing the display panel according to the second exemplary embodiment.

FIG. 4E is a cross sectional view illustrating an example of a fifth step of the method for manufacturing the display panel according to the second exemplary embodiment.

FIG. 7 is a schematic cross sectional view showing a first structural example of a display panel according to a fourth exemplary embodiment.

FIG. 8A is a cross sectional view illustrating an example of a first step of a method for manufacturing the display panel according to the fourth exemplary embodiment that can be applied to the first structural example.

FIG. 8B is a cross sectional view illustrating an example of a second step of the method for manufacturing the display panel according to the fourth exemplary embodiment that can be applied to the first structural example.

FIG. 8C is a cross sectional view illustrating an example of a third step of the method for manufacturing the display panel according to the fourth exemplary embodiment that can be applied to the first structural example.

FIG. 8D is a cross sectional view illustrating an example of a fourth step of the method for manufacturing the display panel according to the fourth exemplary embodiment that can be applied to the first structural example.

FIG. 9 is a schematic cross sectional view showing a second structural example of a display panel according to the fourth exemplary embodiment.

FIG. 10A is a cross sectional view illustrating an example of a first step of the method for manufacturing the display panel according to the fourth exemplary embodiment that can be applied to the second structural example.

FIG. 10B is a cross sectional view illustrating an example of a second step of the method for manufacturing the display panel according to the fourth exemplary embodiment that can be applied to the second structural example.

FIG. 11 is a schematic cross sectional view showing a structural example of the display panel for color display that is modified from the display panel for monochrome display according to the second exemplary embodiment.

FIG. 13 is a schematic cross sectional view showing a second structural example of the display panel according to the fifth exemplary embodiment.

FIG. 14A is a cross sectional view illustrating an example of a first step of the method for manufacturing the display panel according to the fifth exemplary embodiment.

FIG. 14B is a cross sectional view illustrating an example of a second step of the method for manufacturing the display panel according to the fifth exemplary embodiment.

FIG. 15 is a schematic cross sectional view showing an example of practical applications to which the display device according to the present invention is applied.

EXEMPLARY EMBODIMENT

Figure 5:
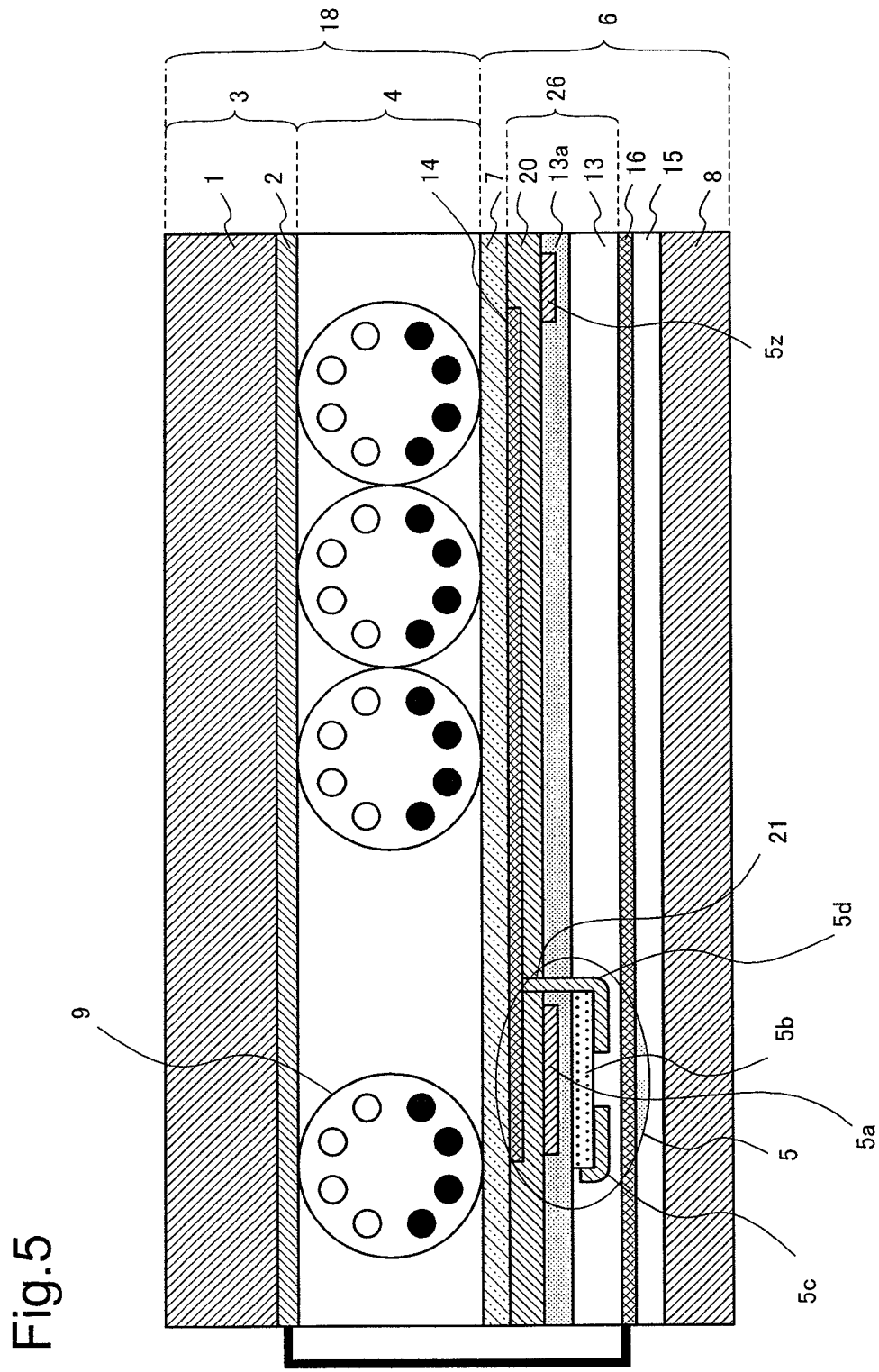
FIG. 5 is a schematic cross sectional view showing a third structural example of a display panel according to the second exemplary embodiment.

Analysis of Image Degradation Phenomenon of an Active Matrix Type Display Device with a Memory Capability at the Time of Image Non-Update First, a displayed image degradation phenomenon of an electronic paper display device (active matrix type display device with a memory capability) that occurs at the time of the image non-update state has been analyzed and verified by the inventor of the present application and the result of the analysis and the verification will be described below.

The electronic paper display device applied to the analysis has an electrophoresis type display panel which includes a TFT substrate on which a thin film transistor (hereinafter, referred to as "TFT") is provided, a counter substrate facing to the TFT substrate, and an electrophoresis display element interposed between the TFT substrate and the counter substrate. Here, the TFT is a switch for driving a pixel (pixel switch). The TFT substrate is formed by pasting a plastic substrate made of polyethylene terephthalate (PET) and the glass substrate of which the TFT is formed on one surface side thereof together with a non-conductive paste (adhesive material). The TFT substrate is composed of two layers that are the plastic substrate and the glass substrate. This is because a buffer layer such as a soft plastic substrate, a plastic layer or the like is required for the shock absorption of the impact on the glass substrate because the thickness of the glass substrate on which the TFT is formed is small, that is 0.1 mm to 0.7 mm, and it is fragile. In this analysis, in order to suppress the static electricity on the surface of the plastic substrate, a display panel of which an antistatic agent is sprayed on the surface of the plastic substrate is used.

In such electronic paper display device, first, the display drive of the electrophoresis type display panel is performed, and the display panel is set to the image update state in which a desired image has been displayed or written. After that, the electrophoresis type display panel is controlled to a non display drive state and set to the image non-update state in which the image displayed in the display panel is held or cannot be written. The result of the image analysis shows that disturbance of an image or deterioration in image quality mentioned above does almost not occur when this drive method is used.

However, when a display of the display device is continuously performed for a long time period for the image update by using an input method such as a pen input method with which a picture is directly drawn on a screen of an electronic paper, a touch panel input method with which the screen is directly touched by a human body or the like for the input operation, deterioration in image has occurred at the time of image non-update state. Specifically, a phenomenon in which the color displayed in the screen gradually changes from a white color to a gray color has been observed. The inventor of the present application supposes that such phenomenon is caused by the following reasons.

The TFT needs a gate signal as a control signal (or a selection signal) for driving the TFT. In the TFT applied to the above-mentioned electrophoresis type display panel, for example, a positive voltage of about +25 volts is applied to a gate terminal as the gate signal at the time of "ON" operation (selection state). On the other hand, for example, a negative voltage of about −25 volts is applied to the gate terminal as the gate signal at the time of "OFF" operation (non-selection state). Here, the inventor of the present application has verified a case in which the above-mentioned electrophoresis type display panel is applied to a display device with SVGA (Super Video Graphics Array) resolution (800×600 pixels).

Generally, in a display drive control, the above-mentioned "ON" time (selection period) is about 0.027 ms, and the "OFF" time (non-selection period) is set to about 16.6 ms. Therefore, a major part of the display drive cycle of the TFT is the "OFF" time, and the voltage of −25 volts that is a negative voltage at the time of "OFF" operation is continuously applied to a gate wiring arranged on the TFT substrate substantially. As a result, a direct current (DC) voltage of −25 volts is continuously applied to the glass substrate on which the TFT is formed and the plastic substrate of the TFT substrate. Therefore, the charge up occurs in an adhesive layer formed of a non-conductive paste that exists on a boundary face between the glass substrate and the plastic substrate and also occurs inside the plastic substrate. The inventor of the present application supposes that an electric field induced by the charge up has an influence on an operation state of the electrophoresis display element.

As mentioned above, the electronic paper display device is requested to hold the image even at the time of image non-update state. However, it is verified that a problem of disturbance of an image or deterioration in image quality occurs in the electronic paper display device having the plastic substrate or the TFT substrate having the plastic layer through the analysis performed by the inventor of the present application. The inventor of the present application supposes that the problem occurs by the charge up of the plastic substrate or the adhesive layer caused by a direct current electric field generated by not only the static electricity on the surface of the plastic substrate but also the gate signal (negative voltage) or the like applied to the gate wiring in order to hold the TFT in the "OFF" state.

In order to solve such problem, various kinds of studies have been performed by the inventor of the present application and the following conclusion has been obtained. Namely, the conclusion is that the above-mentioned disturbance of an image or deterioration in image quality can be prevented by providing an electric field shield layer between the wiring arranged on the TFT substrate and the plastic substrate or the adhesive layer.

A display device and an exemplary embodiment of a method for manufacturing thereof according to the present invention will be described in detail below.

First Exemplary Embodiment

FIG. 1 is a schematic cross sectional view of a first exemplary embodiment of a display device according to the present invention. Here, a part of hatching to be illustrated in a cross-section is omitted for convenience of illustration.

As shown in FIG. 1, a display panel which can be applied to a display device according to the first exemplary embodiment includes a first substrate 100, a second substrate 200 and a display element layer 300.

The first substrate 100 has a structure in which a device layer 130 is stacked on an insulating substrate 110 via a first conductive layer 120. The device layer 130 includes a pixel electrode 132 connected to at least a pixel switch 131 and a wiring 133. The pixel switch 131, the pixel electrode 132 and the wiring 133 are arranged so as to correspond to each of a plurality of display pixels arranged on the display panel.

The second substrate 200 includes a second conductive layer 210 that is provided so as to face the pixel electrode 132 arranged on the above-mentioned first substrate 100. The second conductive layer 210 is formed on the insulating substrate.

The display element layer 300 is interposed between the above-mentioned first substrate 100 and the second substrate 200. Namely, the present invention has a structure in which the pixel electrode 132 of the first substrate 100 side faces the second conductive layer 210 of the second substrate 200 side via the display element layer 300.

In the display device of the exemplary embodiment, a specific electric potential is applied to the first conductive layer 120 and the second conductive layer 210 of the display panel having the above-mentioned structure at least at the time of image non-update of the display pixel. Here, the electric potential of the first conductive layer 120 and the electric potential of the second conductive layer 210 are set to the same value (specific electric potential) and the specific electric potential may be a ground potential.

Namely, in the display panel applied to this exemplary embodiment, the electric potential of the first conductive layer 120 and the electric potential of the second conductive layer 210 are set to the specific electric potential (the same electric potential or a ground potential) at least at the time of image non-update state so that no electric potential difference between both layers is generated. As a result, in this exemplary embodiment, the electric field induced by the static electricity generated on the surface of the insulating substrate 110 and a direct current electric field from the wiring 133 or the like can be shielded. Accordingly, because the charge up of the insulating substrate 110 can be suppressed, the liquid crystal display device according to the exemplary embodiment has advantages of which disturbance of an image or deterioration in image quality can be prevented at the time of the image non-update state.

Second Exemplary Embodiment

First Structural Example

FIG. 2 is a schematic cross sectional view showing a first structural example of a display panel according to a second exemplary embodiment. Here, a part of hatching to be illustrated in a cross-section is omitted for convenience of illustration.

As shown in FIG. 2, the first structural example of the display panel which can be applied to the display device (electronic paper display device) according to the second exemplary embodiment has a structure in which an electrophoresis type display panel is included in which a counter substrate 3, an electrophoresis display element 4 and a TFT substrate 6 are stacked in order. A material in which the counter substrate 3 and the electrophoresis display element 4 are stacked forms an electrophoresis display element film 18. Further, this display panel has a structure in which an observer views a display of the electrophoresis display element 4 via the counter substrate 3, wherein an upper side of the drawing is a viewing side. Here, in the structure, the counter substrate 3 corresponds to the second substrate of the present invention, the electrophoresis display element 4 corresponds to the display element layer of the present invention, and the TFT substrate 6 corresponds to the first substrate of the present invention.

In this structural example, the counter substrate 3 has a structure in which a counter electrode 2 formed as for example, a single planar electrode, is provided on one surface side (that is a lower side in the drawing) of the plastic substrate 1. The counter electrode 2 is provided in a region corresponding to at least a forming region (that is a display region) of which a plurality of pixel electrodes 14 are arranged on the TFT substrate 6 mentioned later. In this structural example, for example, polyethylene terephthalate (PET), polyester, polyethersulfone (PES), polyimide film, polycarbonate (PC) or the like can be applied to the plastic substrate 1 used for the counter substrate 3. Here, in the structure, the counter electrode 2 corresponds to the second conductive layer of the present invention.

The electrophoresis display element 4 is for example, a microcapsule type electrophoresis display element and interposed between the counter substrate 3 and the TFT substrate 6. Specifically, the electrophoresis display element 4 has a structure in which for example, a plurality of spherical microcapsules 9 whose diameter is about 40 μm are two-dimensionally spread in a binder (that is a binding agent) made of high polymer material (polymer) and has a sheet shape.

For example, a solvent such as isopropyl alcohol (IPA) or the like is encapsulated in the microcapsule 9. The microcapsule 9 has a structure in which an infinite number of white particles 10 using for example, a negatively charged titanium oxide white pigment and a black particle 11 using for example, a positively charged carbon black pigment that are nano-sized particles are discretely suspended in the above-mentioned solvent.

The TFT substrate 6 has a structure in which the glass substrate 7 on which a TFT layer 26 is provided is stacked on the plastic substrate 8 via a conductive adhesive layer 15. The glass substrate 7 on which the TFT layer 26 is provided forms a TFT glass substrate 27 shown in FIG. 2. Here, the conductive adhesive layer 15 corresponds to the first conductive layer of the present invention, the TFT layer 26 corresponds to the device layer of the present invention, and the plastic substrate 8 corresponds to the insulating substrate of the present invention.

The TFT layer 26 is provided on one surface side (that is an upper side in the drawing) of the glass substrate 7 and includes the TFT 5 as a switch for driving a pixel (hereinafter, referred to as "pixel switch"), various wirings 5z, passivation film 13 and a pixel electrode 14.

Here, as shown in FIG. 2, the TFT 5 that can be applied to the pixel switch has a thin film transistor structure in which a gate electrode 5a, a gate insulating film 13a, a semiconductor layer 5b, a drain electrode 5c, and a source electrode 5d. Further, an inorganic semiconductor material such as amorphous silicon (a-Si), polysilicon (p-Si) or the like may be used for the semiconductor layer 5b of the TFT 5. An organic semiconductor material such as polythiophene or the like may be used for the semiconductor layer 5b. Moreover, a semiconductor material such as transparent zinc oxide (ZnO) or the like may be used for the semiconductor layer 5b.

The various wirings 5z are wirings for driving the TFT 5. Specifically, those are various wirings connected to the TFT 5 such as a gate wiring, a data wiring and the like.

The passivation film 13 is an insulating film of single layer or multiple layers which covers and protects the TFT 5 and the various wirings 5z. Specifically, in this structural example, for example, an inorganic insulating film such as silicon nitride (SiNx) film or the like, an organic film such as acrylic or the like, or a laminated film of those can be applied to the passivation film 13.

The pixel electrode 14 is formed so as to extend on the passivation film 13 and connected to the source electrode 5d of the TFT 5 via a contact hole 21 provided on the passivation film 13 as shown in FIG. 2. Namely, the pixel electrode 14 is formed so as to face the counter electrode 2 of a counter substrate 3 side via the electrophoresis display element 4 mentioned above. The TFT 5 and the pixel electrode 14 are two-dimensionally arranged on the glass substrate 7 so as to correspond to each of a plurality of display pixels arranged on the display panel.

The glass substrate 7 used for the TFT substrate 6 is a thin glass plate whose thickness is formed for example, more than 0 (zero) and not greater than 300 μm (not greater than 0.3 mm) and has a flexibility. In this structural example, polyethylene terephthalate (PET), polyester, polyether sulphone (PES), polyimide film, polycarbonate (PC) or the like can be applied to the plastic substrate 8 like the plastic substrate 1 of the counter substrate 3 mentioned above.

As shown in FIG. 2, the conductive adhesive layer 15 is an adhesive layer for closely joining the glass substrate 7 and the plastic substrate 8. The conductive adhesive layer 15 is formed by applying a paste or an adhesive material in which for example, a conductive particle (not shown) is mixed. Further, in this structural example, for example, graphite, gold, a nickel plating particle or the like can be used for the conductive particle. In this structural example, for example, silicon, acrylic resin or the like can be used for the paste or the adhesive material.

It is desirable that the surface resistivity of the conductive adhesive layer 15 is set based on a time period of which the electric field induced by the static electricity has no effect on the electrophoresis display element 4. Specifically, it is desirable that the surface resistivity is set to a value with which for example, the static electricity (electric charge) generated on the TFT substrate 6 can be discharged within 1 to 10 seconds. According to the result of the experiment performed by the inventor of the present application, it is desirable that the surface resistivity, is not greater than $3 \times 10^9 \Omega/\square$.

In this exemplary embodiment, as schematically shown in FIG. 2, when at least the display device (that is each display pixel arranged on the display panel) is in the image non-update state, a control is performed with which the conductive adhesive layer 15 is electrically connected to the counter electrode 2 of the counter substrate 3 or a ground line. As a result, the static electricity (electric charge) generated on the conductive adhesive layer 15 and an adjacent substrate thereof is discharged by a counter potential or a ground potential (0V). Namely, the conductive adhesive layer 15 prevents the electric field induced by the voltage applied to the various wirings 5z (in particular, the gate wiring) of the TFT layer 26 from leaking to the plastic substrate 8 side. Moreover, the conductive adhesive layer 15 prevents the charge up caused by the static electricity on the surface of the plastic substrate 8. Thus, the conductive adhesive layer 15 functions as an electric field shielding layer.

Second Structural Example

FIG. 3 is a schematic cross sectional view showing a second structural example of a display panel according to the second exemplary embodiment. Here, in the figure, the same reference numbers are used for the same structure as the panel structure (refer to FIG. 2) shown in the first structural example mentioned above and the description thereof will be simplified or omitted.

In the first structural example mentioned above, the panel structure in which the conductive adhesive layer 15 formed of the paste or the adhesive material (hereinafter, it is called as "conductive paste" for convenience) in which the conductive particle is mixed is used as the electric field shielding layer. The present invention is not limited to this.

Namely, another structural example (the second structural example) of a display panel according to the exemplary embodiment has a panel structure in which a shield electrode is provided in place of the conductive adhesive layer 15. Specifically, as shown in FIG. 3, the second structural example of the display panel has a structure in which a shield electrode 16 formed of a transparent conductive film material is interposed between the glass substrate 7 and the plastic substrate 8 of which the TFT substrate 6 is composed. In this structural example, indium tin oxide (hereinafter, referred to as "ITO") or the like can be used for the transparent conductive film material. Here, the shield electrode 16 may be pasted to the glass substrate 7 and the plastic substrate 8 by using an insulation (or non-conductive) paste or adhesive material. The ITO film of which the shield electrode 16 is composed may be formed on the glass substrate 7 side or on the plastic substrate 8 side. Here, the shield electrode 16 in this structural example corresponds to the first conductive layer or a conductive thin film electrode of the present invention.

In this exemplary embodiment, as schematically shown in FIG. 3, when at least a display device (that is each display pixel) is in the image non-update state, a control is performed with which the shield electrode 16 is electrically connected to the counter electrode 2 of the counter substrate 3 or a ground line so that those have the same electric potential. Namely, the shield electrode 16 functions as the electric field shielding layer which discharges the static electricity generated on the shield electrode 16 and the adjacent substrate thereof by the counter potential or the ground potential.

Thus, in each panel structure according to this exemplary embodiment, when at least a display device is in the image non-update state, the electric field by the static electricity generated on the surface of the plastic substrate 8 and a direct current electric field from the gate wiring or the like of the TFT layer 26 are shielded. Here, the electric field shielding layer is the conductive adhesive layer 15 or the shield electrode 16 mentioned above. Accordingly, the display device according to this exemplary embodiment has advantages of which degradation of a displayed image (disturbance of an image or deterioration in image quality) at the time of the non display drive (image non-update state) can be prevented and an electronic paper display device having excellent reliability can be realized.

(Manufacturing Method)

Next, a method for manufacturing the display panel having the panel structure shown in the first structural example mentioned above will be described with reference to a drawing.

FIGS. 4A to 4E are cross sectional views illustrating examples of steps of method for manufacturing the display panel according to the second exemplary embodiment. Here, the manufacturing method will be described with reference to FIG. 2 showing the first structural example properly.

In the method for manufacturing the display panel having the first structural example mentioned above, first, as shown in FIG. 4A, the TFT layer 26 is formed on one surface side (that is an upper side in the drawing; device forming surface side) of the glass substrate 7. Specifically, as shown in FIG. 2, after the gate electrode 5a and the various wirings 5z including the gate wiring connected to the gate electrode 5a are formed in one surface side of the glass substrate 7, the gate insulating film 13a for covering the gate electrode 5a and the various wirings 5z is formed. In FIG. 4A, the gate electrode 5a and the gate insulating film 13a are not shown. Next, the semiconductor layer 5b, the drain electrode 5c, the source electrode 5d and the various wirings (a reference number is omitted in FIG. 4A) including the data wiring connected to the drain electrode 5c are formed on the gate insulating film 13a corresponding to the gate electrode 5a. Next, after the passivation film 13 which covers the semiconductor layer 5b, the drain electrode 5c, the source electrode 5d and the various wirings including the data wiring is formed on the gate insulating film 13a, the contact hole 21 is formed, on the passivation film 13. Additionally, the pixel electrode 14 which is electrically connected to the source electrode 5d exposed in the contact hole 21 and extends on the passivation film 13 is formed. As a result, a TFT glass substrate 27 which includes the TFT layer 26 on which the TFT 5 and the pixel electrode 14 are arranged on one surface side of the glass substrate 7 so as to correspond to each display pixel of the display panel is produced.

Next, as shown in FIG. 4B, a protective film 17 is pasted so as to be in contact with each pixel electrode 14 formed on one surface side (that is an upper side in the drawing) of the TFT glass substrate 27.

Next, as shown in FIG. 4C, by placing this TFT glass substrate 27 in an etching solution, the glass substrate 7 is etched from another surface side (that is a lower side in the drawing; a glass surface side) of the glass substrate 7 on which the TFT layer 26 is not formed. In the etching step, the etching process is performed based on an etching rate of the glass substrate 7 that is measured in advance until the desired film thickness is obtained and when the desired film thickness is obtained, the TFT glass substrate 27 is taken out from the etching solution and the etching process is ended (stopped). Here, the etching process is performed so that the thickness of the glass substrate 7 becomes for example, more than 0 (zero) and not greater than 300 μm. Further, the inventor of the present application has confirmed that when the thickness of the glass substrate 7 is greater than 300 μm, the display panel has insufficient flexibility.

Next, a conductive paste is applied to the another surface side (that is a lower side in the drawing; etching surface) of the glass substrate 7 on which the above-mentioned etching process is performed and the plastic substrate 8 is pasted. After that, by peeling off the protective film 17 pasted on the one surface side (that is an upper side in the drawing) of the TFT glass substrate 27, as shown in FIG. 4D, the TFT layer 26 on which the devices such as the TFT 5 and the like are formed is transferred to the plastic substrate 8 side. As a result, the TFT layer 26 having the TFT 5, the various wirings 5z and the like in the one surface side of the glass substrate 7 is formed and the TFT substrate 6 of which the plastic substrate 8 is pasted on the another side of the glass substrate 7 via the conductive adhesive layer 15 is produced.

Next, as shown in FIG. 4E, an electrophoresis display element film 18 is pasted to the TFT layer 26 of the TFT substrate 6. In this step, the electrophoresis display element film 18 is pasted so that the electrophoresis display element 4 is in contact with each pixel electrode 14 formed on the TFT layer 26 and the above-mentioned pixel electrode 14 faces the counter electrode 2 of the counter substrate 3 via the electrophoresis display device 4. Further, after this step or in parallel with this step, means for electrically connecting the conductive adhesive layer 15 formed on the TFT substrates 6 side and the counter electrode 2 on the electrophoresis display element film 18 (counter substrate 3) side is formed. Specifically, when at least a display device (display pixel) is in the image non-update state, a wiring for electrically connecting the above-mentioned conductive adhesive layer 15 and the counter electrode 2 and switching means are formed appropriately. Accordingly, the display panel having the panel structure shown in FIG. 2 is produced.

Further, in the above-mentioned manufacturing method, a step in which the plastic substrate 8 is pasted by applying the conductive paste on the another surface side (that is a lower side in the drawing; etching surface) of the glass substrate 7 is described as shown in FIG. 4D. In place of this step, a step in which the shield electrode 16 formed of the transparent conductive film material such as ITO or the like is formed on the etching surface, the plastic substrate 8 is pasted by applying a non-conductive paste, and the same step mentioned above is performed may be used. By using such manufacturing method, the display panel having the panel structure shown in FIG. 3 is produced.

Third Structural Example

FIG. 5 is a schematic cross sectional view showing a third structural example of a display panel according to the second exemplary embodiment. Here, in the figure, the same reference numbers are used for the same structure as the panel structures (refer to FIG. 2 and FIG. 3) shown in the first and second structural examples mentioned above and the description thereof will be simplified or omitted.

In the first and second structural examples mentioned above, the panel structure in which the TFT layer 26 and the electrophoresis display element film 18 are stacked on the device forming surface side of the glass substrate 7 and the plastic substrate 8 is stacked on the etching surface side of the glass substrate 7 via the conductive adhesive layer 15 and the shield electrode 16 has been described. The present invention is not limited to this panel structure.

Namely, another structural example (the third structural example) of a display panel according to the exemplary embodiment has a structure in which the plastic substrate 8 is stacked on the surface of the TFT layer 26 on the device forming surface side of the glass substrate 7 via the shield electrode 16 and the conductive adhesive layer 15. This structural example has a structure in which the electrophoresis display element film 18 is stacked on the etching surface side of the glass substrate 7.

Specifically, as shown in FIG. 5, the third structural example of the display panel has a structure in which a plurality of pixel electrodes 14 are arranged on another surface side (that is a lower side in the drawing) of the glass substrate 7. A plurality of TFTs 5 are arranged on a surface (that is a lower side in the drawing) of an insulating interlayer film 20 that is formed so as to cover the pixel electrode 14. Here, the TFT 5 includes the gate electrode 5a, the gate insulating film 13a, the semiconductor layer 5b, the drain electrode 5c and the source electrode 5d like the above mentioned structural example. The source electrode 5d of each TFT 5 is connected to each pixel electrode 14 via the contact hole 21 formed in the gate insulating film 13a and the interlayer film 20.

The interlayer film 20 and the gate insulating film 13a in which the TFT 5 is included are covered by the passivation film 13. The shield electrode 16 is arranged on the surface (that is a lower side in the drawing) of the passivation film 13. Here, the shield electrode 16 is provided in a region corresponding to the display region of the display panel and not provided in a terminal region (not shown) around the display region. That is because a terminal electrode which is connected to the TFT 5 via the various wirings 5z and connected to an IC chip (driver chip) for a display drive has to be formed in the terminal region so as to be exposed. In addition to this, because an image is not displayed in the terminal region, an electrostatic charge does not affect a display condition in the electrophoresis display element film 18.

The plastic substrate 8 is stacked on the surface (that is a lower side in the drawing) of the passivation film 13 including the shield electrode 16 via the conductive adhesive layer 15 having a function as the electric field shielding layer. On the other hand, the electrophoresis display element film 18 including the counter substrate 3 and the electrophoresis display elements 4 is stacked on one surface side (an upper side in the drawing) of the thinly etched glass substrate 7.

In this exemplary embodiment, as schematically shown in FIG. 5, when at least a display device is in the image non-update state, a control is performed with which the electric field shielding layer composed of the conductive adhesive layer 15 and the shield electrode 16 is electrically connected to the counter electrode 2 or a ground line so that those have the same electric potential.

Further, in such panel structure, a voltage is applied to the electrophoresis display element 4 of the electrophoresis display element film 18 from each pixel electrode 14 via the thinly etched glass substrate 7. Therefore, in order to well drive and control the colored particles (white particle 10 and black particle 11) in the microcapsule 9, it is desirable that the film thickness of the glass substrate 7 is not greater than 40 μm that is the size of the electrophoresis display element film 18 (specifically, the diameter of the microcapsule 9).

Thus, in the panel structure according to this exemplary embodiment, the electric field shielding layer and the counter electrode 2 are electrically connected so that an electric potential difference between the electric field shielding layer composed of the conductive adhesive layer 15 and the shield electrode 16 and the counter electrode 2 of the counter substrate 3 is not generated. As a result, in the display panel according to this exemplary embodiment the charge up of the plastic substrate 8 and the conductive adhesive layer 15 can be suppressed by shielding the electric field by the static electricity generated on the surface of the plastic substrate 8 and the direct current electric field from the gate wiring or the like. Accordingly, the display device according to this exemplary embodiment has advantages of which degradation of a displayed image at the time of the non display drive (image non-update state) can be prevented and an electronic paper display device having excellent reliability can be realized.

Third Exemplary Embodiment

Next, a third exemplary embodiment of a display panel which can be applied to a display device according to the present invention will be described with reference to a drawing.

Figure 6:
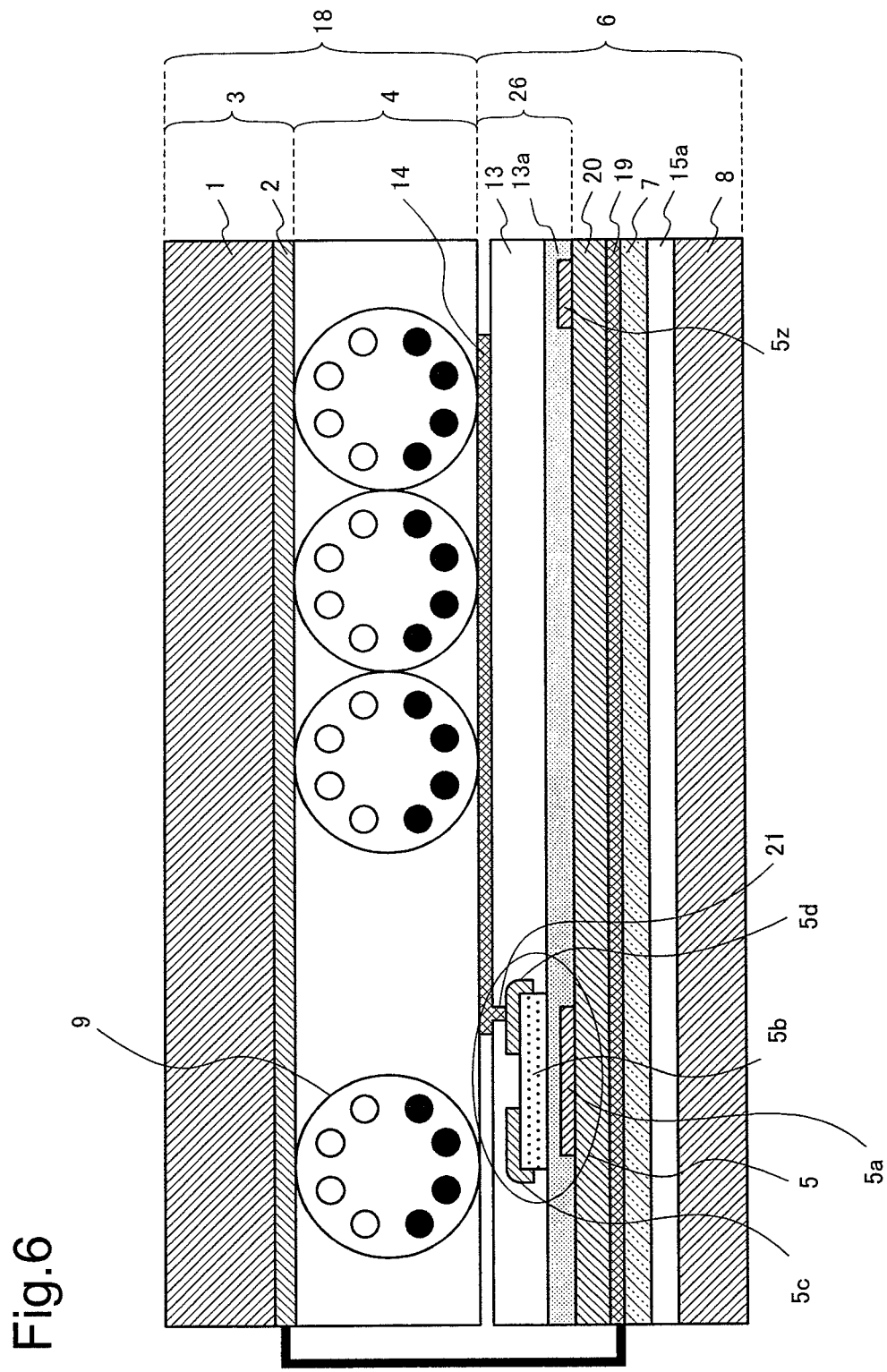
FIG. 6 is a schematic cross sectional view showing a third exemplary embodiment of a display panel which can be applied to a display device according to the present invention.

FIG. 6 is a schematic cross sectional view showing the third exemplary embodiment of the display panel which can be applied to the display device according to the present invention. Here, in the figure, the same reference numbers are used for the same structure as each panel structure shown in the second exemplary embodiment mentioned above and the description thereof will be simplified or omitted.

In the third exemplary embodiment, a case in which an electric field shielding layer provided on the TFT substrate 6 side is used as a storage electrode for holding a pixel potential written in the pixel electrode 14 will be described. Here, because a structure excluding the TFT substrate 6 (that is, the electrophoresis display element film 18 having the counter substrates 3 and the electrophoresis display elements 4) is the same as that of the second exemplary embodiment mentioned above, the description is omitted.

As shown in FIG. 6, the display panel which can be applied to the display device according to the third exemplary embodiment has a structure in which the TFT substrate 6 is formed by stacking the TFT layer 26, the interlayer film 20, a storage capacity electrode 19, the glass substrate 7, an interlayer adhesive layer 15a and the plastic substrate 8 in order. Namely, the TFT layer 26 is provided in one surface side (that is an upper side in the drawing) of the glass substrate 7 via the storage capacity electrode 19 and the interlayer film (insulating layer) 20, and the plastic substrate 8 is provided in another surface side (a lower side in the drawing) of the glass substrate 7 via the interlayer adhesive layer 15a.

Here, the TFT layer 26 includes the TFT 5, the various wirings 5z, the passivation film 13 and the pixel electrode 14 like the second exemplary embodiment mentioned above.

In this exemplary embodiment, for example, an insulating inorganic planarization film such as tetraethoxysilane (TEOS) or the like can be used for the interlayer film 20. In this exemplary embodiment, for example, a conductive layer formed of the conductive film material such as ITO or the like can be used for the storage capacity electrode 19. The storage capacity electrode 19 is formed as for example, a single planar electrode.

The interlayer adhesive layer 15a is an adhesive layer for closely joining the glass substrate 7 and the plastic substrate 8. The interlayer adhesive layer 15a is formed for example, by applying a non-conductive paste or an adhesive material. Further, the interlayer adhesive layer 15a may be formed of a conductive paste like the conductive adhesive layer 15 shown in the second exemplary embodiment mentioned above.

Because the glass substrate 7 and the plastic substrate 8 are the same as those of the second exemplary embodiment mentioned above, the description thereof will be omitted.

In such panel structure, a storage capacity (capacitive component) is formed between each pixel electrode 14 provided in the TFT substrate 6 so as to correspond to each display pixel in a display region and the storage capacity electrode 19 provided as the single planar electrode mentioned above. Here, the storage capacity electrode 19 has a function to hold the storage capacity and additionally has a function to operate as the electric field shielding layer at the time of the non display drive (image non-update state) of the electrophoresis display element 4. Therefore, it is desirable that the storage capacity electrode 19 is provided in a region corresponding to almost all pixel electrodes 14 arranged in the display region.

In this exemplary embodiment, as schematically shown in FIG. 6, when at least a display device (display panel) is in the image non-update state, a control is performed with which the storage capacity electrode 19 is electrically connected to the counter electrode 2 of the counter substrate 3 or a ground line so that those have the same electric potential.

Thus, in the panel structure according to this exemplary embodiment, the charge up of the plastic substrate 8 of the TFT substrate 6 in the image non-update state is suppressed like the second exemplary embodiment mentioned above. Accordingly, the display device according to this exemplary embodiment has advantages of which degradation of a displayed image (disturbance of an image or deterioration in image quality) can be prevented. Additionally, in the panel structure according to this exemplary embodiment, a large storage capacity is easily formed in each display pixel. Accordingly, the display device according to this exemplary embodiment has advantages of which the drive ability (that is the ability to hold the image display state) of the electrophoresis display element can be improved and a high aperture ratio can be achieved.

Fourth Exemplary Embodiment

Next, a fourth exemplary embodiment of a display panel which can be applied to a display device according to the present invention will be described with reference to a drawing.

First Structural Example

FIG. 7 is a schematic cross sectional view showing a first structural example of a display panel according to the fourth exemplary embodiment. Here, in the figure, the same reference numbers are used for the same structure as the panel structure shown in the second exemplary embodiment mentioned above and the description thereof will be simplified or omitted.

In the second and third exemplary embodiments mentioned above, the TFT substrate 6 includes the TFT layer 26 and the plastic substrate 8. The TFT layer 26 is provided on one surface side of the glass substrate 7 and the plastic substrate 8 is provided on another surface side thereof via the electric field shielding layer. Namely, in the second and third exemplary embodiments, the panel structure has a residual film of glass whose thickness is more than 0 (zero) and not greater than 300 μm (0.3 mm) that is obtained by etching the another side of the glass substrate 7. The present invention is not limited to this.

Namely, the first structural example of the display panel according to this exemplary embodiment has a panel structure in which the insulating interlayer film is provided on the TFT substrate 6 in place of the residual film of glass (glass substrate 7 shown in the second structural example of the second exemplary embodiment mentioned above). Specifically, as shown in FIG. 7, this structural example has the structure in which the interlayer film 20 is provided on the plastic substrate 8 via the conductive adhesive layer 15 and the shield electrode 16 and the TFT layer 26 is provided on the interlayer film 20. In this structural example, the electrophoresis display element film 18 having the electrophoresis display elements 4 and the counter substrate 3 is directly stacked on the surface of the TFT layer 26.

(Manufacturing Method)

FIGS. 8A to 8F are cross sectional views illustrating examples of steps of method for manufacturing the display panel according to the fourth exemplary embodiment that can be applied to the first structural example. Here, in the figure, the explanation of the same process as that of the manufacturing method shown in the second exemplary embodiment mentioned above will be simplified.

In the manufacturing method of the display panel having the panel structure (FIG. 7) mentioned above, first, as shown in FIG. 8A, an etching stopper layer 22 is formed on one surface side (that is an upper side in the drawing; device forming surface side) of the glass substrate 7. Here, in this exemplary embodiment, a material such as silicon-rich silicon oxynitride (SiONx) or the like which is hardly dissolved by a glass etching liquid can be used for the etching stopper layer 22. Next, after the shield electrode 16 that also operates as an electric field shielding layer is formed on the whole surface of the etching stopper layer 22 by using the conductive film material such as ITO or the like, the interlayer film 20 is formed on the etching stopper layer 22 including the shield electrode 16. Here, in this exemplary embodiment, for example, an inorganic insulating film such as tetra-ethoxysilane (TEOS) or the like can be used for the interlayer film 20 like the third exemplary embodiment mentioned above. Next, the TFT layer 26 including the TFT 5, the various wirings 5z, the passivation film 13 and the pixel electrode 14 is formed on the interlayer film 20, and the glass substrate 27 including the etching stopper layer 22 and the shield electrodes 16 is formed.

Next, as shown in FIG. 8B, the protective film 17 is pasted on the surfaces of the TFT layer 26 of the TFT glass substrate 27 so as to be in contact with each pixel electrode 14. Further, in this step, the protective film 17 may be pasted by using a paste or an adhesive material having a peeling property in which the adhesive force is decreased by irradiation of ultraviolet (UV) ray. Another material that has the same effect, for example, a paste or an adhesive material having a peeling property in which the adhesive force is decreased by heating may be used.

Next, as shown in FIG. 8C, by placing this TFT glass substrate 27 in the etching solution, the glass substrate 7 is etched from another surface side (that is a lower side in the drawing; the glass surface side) of the glass substrate 7. In this etching step of the glass substrate 7, the etching is continued until the glass substrate 7 is completely removed and the etching stopper layer 22 is completely exposed.

Next, as shown in FIG. 8D, the exposed etching stopper layer 22 mentioned above is removed by using a dry etching method. In the step for etching this etching stopper layer 22, the etching is continued until the etching stopper layer 22 is completely removed and the shield electrode 16 provided in an upper layer of the etching stopper layer 22 is completely exposed. Namely, the shield electrode 16 formed of the ITO film functions as an etching stopper layer for removing the etching stopper layer 22 formed of the silicon oxynitride film by etching. As a result, the devices such as the TFT 5 and the like are transferred from the glass substrate 7 side to the protective film 17 side.

Figure 8E:
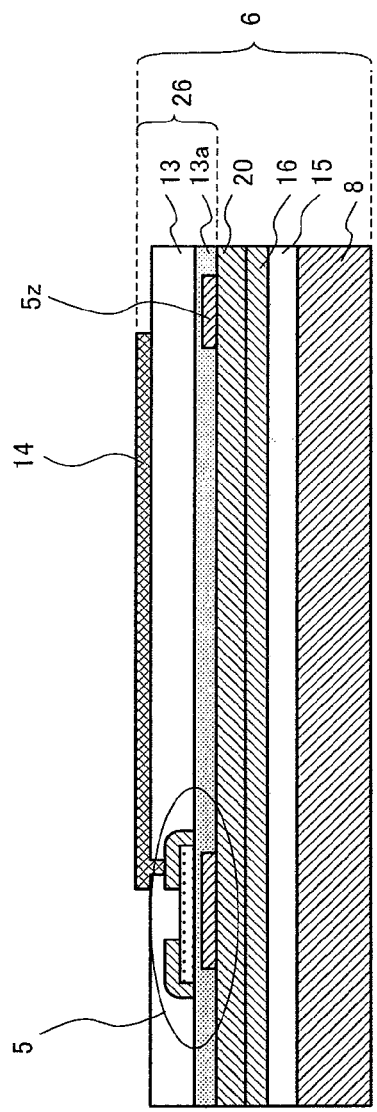
FIG. 8E is a cross sectional view illustrating an example of a fifth step of the method for manufacturing the display panel according to the fourth exemplary embodiment that can be applied to the first structural example.

Next, as shown in FIG. 8E, the conductive paste is applied to the surface of the shield electrode 16 exposed by removing the etching stopper layer 22 and the plastic substrate 8 is pasted. Next, the protective film 17 pasted to the TFT layer 26 is peeled off. As a result, the devices such as the TFT 5 and the like and the shield electrode 16 are transferred from the protective film 17 side to the plastic substrate 8 side. Namely, the TFT substrate 6 in which the TFT layer 26 having the TFT 5, the various wirings 5z and the like is formed in one surface side (that is an upper side in the drawing) of the plastic substrate 8 via the conductive adhesive layer 15 formed of the conductive paste, the shield electrode 16 and the interlayer film 20 is produced. Here, as mentioned above, when the protective film 17 is pasted on the surfaces of the TFT layer 26, by using the paste or the adhesive material having a peeling property in which the adhesive force is decreased by irradiation of UV ray or heating, the protective film 17 can be peeled off well without a damage of a device of the TFT layer 26.

Figure 8F:
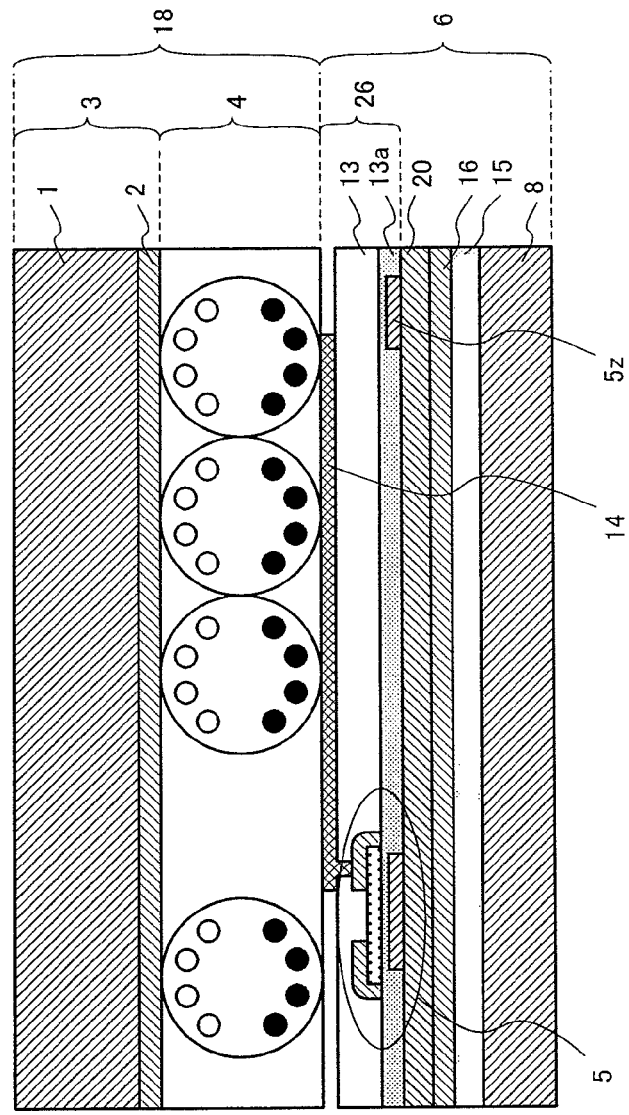
FIG. 8F is a cross sectional view illustrating an example of a sixth step of the method for manufacturing the display panel according to the fourth exemplary embodiment that can be applied to the first structural example.

Next, as shown in FIG. 8F, the electrophoresis display element film 18 is pasted on the one surface side (that is an upper side in the drawing; device forming surface side) of the TFT substrate 6 via the electrophoresis display element 4 so that the pixel electrode 14 faces the counter electrode 2. Further, after this step or in parallel with this step, means for electrically connecting the electric field shielding layer which is composed of the conductive adhesive layer 15 and the shield electrode 16 that are formed in the TFT substrate 6 side and the counter electrode 2 on the electrophoresis display element film 18 (counter substrate 3) side is formed. Specifically, when at least a display device (display panel) is in the image non-update state, a wiring and switching means for electrically connecting the above-mentioned shield electrode 16 and the counter electrode 2 are formed appropriately. Accordingly, the display panel having a panel structure shown in FIG. 7 is produced.

This structural example has the panel structure in which the glass substrate 7 of the TFT substrate 6 which affects flexibility of the display panel is completely removed and in place of the glass substrate 7, the inorganic insulating film (interlayer film 20) is provided. Accordingly, the display device according to this structural example has the same advantages as that of the second and third exemplary embodiments mentioned above and additionally, has an advantage in which flexibility of the display panel can be improved. Further, in this structural example, the explanation of the structure in which the interlayer film 20 formed of the inorganic insulating film such as tetra-ethoxysilane (TEOS) or the like is used has been made. The present invention is not limited to this and the interlayer film 20 formed of another insulating film may be used.

Second Structural Example

FIG. 9 is a schematic cross sectional view showing a second structural example of a display panel according to the fourth exemplary embodiment. Here, in the figure, the same reference numbers are used for the same structure as the panel structure shown in the second exemplary embodiment mentioned above and the description thereof will be simplified.

The second structural example of a display panel according to this exemplary embodiment has a panel structure in which an etching stopper layer is provided in place of the glass substrate 7 (that is the residual film of glass) shown in the third structural example of the second exemplary embodiment mentioned above. Specifically, as shown in FIG. 9, this structural example has a panel structure in which the TFT layer 26 is provided on the plastic substrate 8 via the conductive adhesive layer 15 and the shield electrode 16 and the etching stopper layer 22 is provided on the TFT layer 26. This structural example has a structure in which the electrophoresis display element film 18 that includes the electrophoresis display element 4 and the counter substrate 3 is directly stacked on the surface of the etching stopper layer 22.

(Manufacturing Method)

FIGS. 10A to 10D are cross sectional views illustrating examples of steps of method for manufacturing a display panel according to the fourth exemplary embodiment that can be applied to the second structural example.

In the method for manufacturing a display panel having the panel structure (FIG. 9) mentioned above, first, as shown in FIG. 10A, the etching stopper layer 22 is formed on the one surface side (that is an upper side in the drawing; device forming surface side) of the glass substrate 7. Here, a material such as silicon-rich silicon oxynitride (SiONx) or the like which is hardly dissolved by a glass etching liquid can be used for the etching stopper layer 22 like the first structural example of the exemplary embodiment mentioned above. The film thickness of the etching stopper layer 22 is set to for example, about 0.5 to 3.0 μm. Next, after the plurality of pixel electrodes 14 are formed on the etching stopper layer 22, the interlayer film 20 is formed on the etching stopper layer 22 including the pixel electrodes 14 so as to cover the etching stopper layer 22. Here, an inorganic insulating film can be used for the interlayer film 20 like the third exemplary embodiment mentioned above. Next, the TFT layer 26 including the TFT 5, the various wirings 5z, and the passivation film 13 is formed on the interlayer film 20. At that time, each pixel electrode 14 is connected to the TFT 5 via the contact hole 21 formed in the gate insulating film 13a and the interlayer film 20. Next, an antistatic shield electrode 16 is formed on the whole surface of the TFT layer 26 and the TFT glass substrate 27 including the etching stopper layer 22 and the shield electrode 16 is formed.

Next, as shown in FIG. 10B, a conductive paste is applied on the surface of the shield electrode 16 of the TFT glass substrate 27 and the plastic substrate 8 is pasted.

Figure 10C:
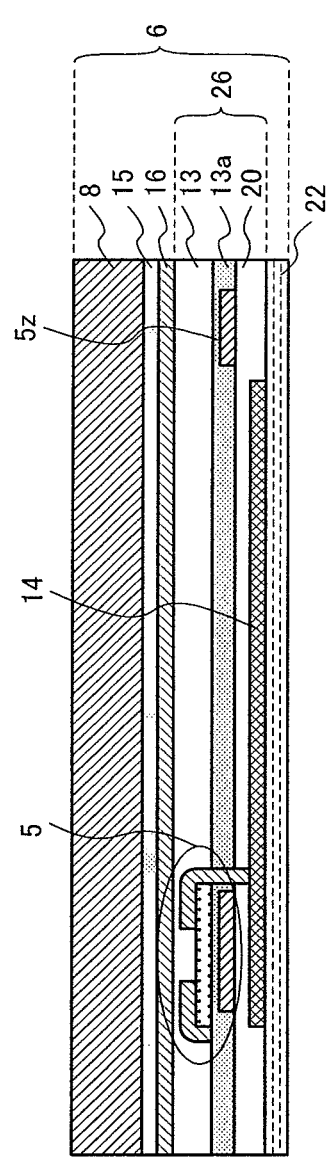
FIG. 10C is a cross sectional view illustrating an example of a third step of the method for manufacturing the display panel according to the fourth exemplary embodiment that can be applied to the second structural example.

Next, as shown in FIG. 10C, by placing this TFT glass substrate 27 in an etching solution, the glass substrate 7 is etched from another surface side (that is a lower side in the drawing; the glass surface side) of the glass substrate 7. In this etching step of the glass substrate 7, the etching process is continued until the glass substrate 7 is completely removed and the etching stopper layer 22 is completely exposed. As a result, the devices such as the TFT 5 and the like and the shield electrode 16 are transferred from the glass substrate 7 side to the plastic substrate 8 side. Namely, the TFT substrate 6 in which the TFT layer 26 including the interlayer film 20 and the etching stopper layer 22 are formed on the surface of the plastic substrate 8 via the conductive adhesive layer 15 formed of the conductive paste and the shield electrode 16 is produced.

Figure 10D:
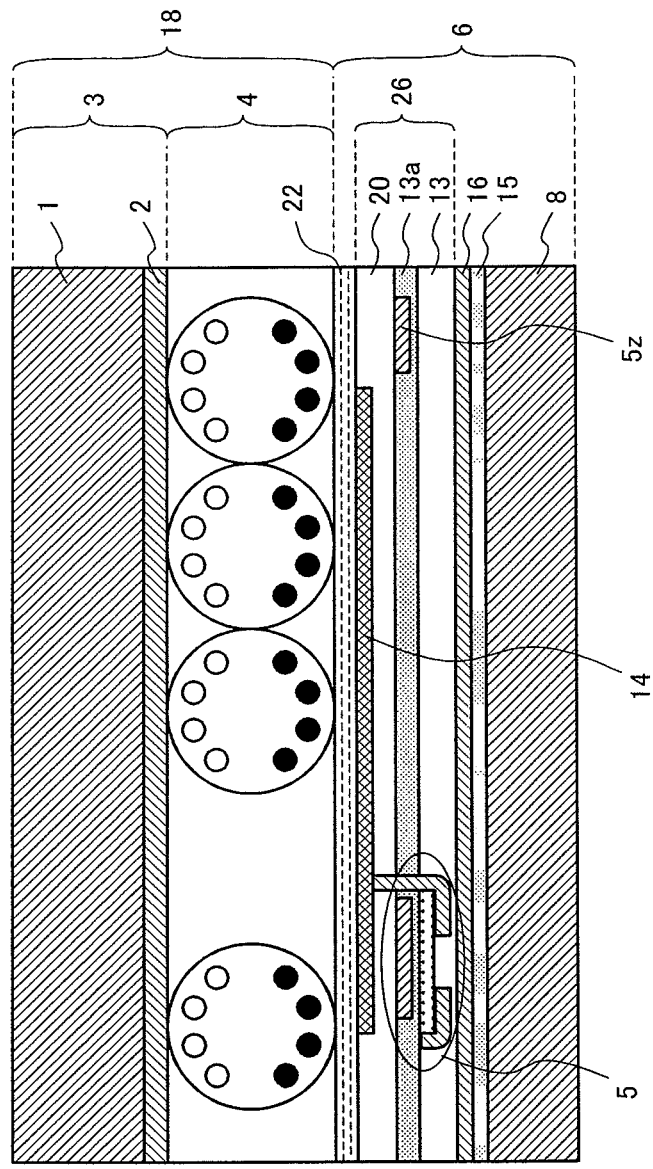
FIG. 10D is a cross sectional view illustrating an example of a fourth step of the method for manufacturing the display panel according to the fourth exemplary embodiment that can be applied to the second structural example.

Next, as shown in FIG. 10D, the TFT substrate 6 is turned upside down and the electrophoresis display element film 18 is pasted on the one surface side (that is an upper side in the drawing; device forming surface side) of the TFT substrate 6 via the etching stopper layer 22 and the electrophoresis display element 4. Here, the electrophoresis display element film 18 is pasted so that the pixel electrode 14 faces the counter electrode 2. Further, after this step or in parallel with this step, means for electrically connecting the electric field shielding layer which is composed of the conductive adhesive layer 15 and the shield electrode 16 that are formed on the TFT substrate 6 side and the counter electrode 2 on the electrophoresis display element film 18 (counter substrate 3) side is formed. Specifically, when at least a display device (display panel) is in the image non-update state, a wiring or switching means for electrically connecting the above-mentioned shield electrode 16 and the counter electrode 2 is formed appropriately. Accordingly, the display panel having the panel structure shown in FIG. 9 is produced.

Thus, this structural example has a panel structure in which the glass substrate 7 of the TFT substrate 6 which affects flexibility of the display panel is completely removed and in place of the glass substrate 7, the thin insulating film (etching stopper layer 22) is provided. Accordingly, the display device according to this structural example has the same advantages as that of the second and third exemplary embodiments mentioned above and additionally, has an advantage in which flexibility of the display panel can be improved.

In a manufacturing method which can be applied to this structural example, when the TFT layer 26 formed on the glass substrate 7 is transferred to the plastic substrate 8, it is not necessary to paste the protective film 17 to the TFT layer 26 and peel off the protective film unlike the first structural example of this exemplary embodiment mentioned above. Accordingly, a manufacturing method that can be applied to this structural example has advantages of which occurrence of a crack or peeling on the TFT layer 26 including the pixel electrode 14 is suppressed and the transfer to the plastic substrate 8 can be well performed.

In this structural example, the film thickness of the etching stopper layer 22 that is used when the glass substrate 7 is removed by etching is set to about 0.5 to 3.0 μm. Namely, in the manufacturing method which can be applied to this structural example, the film thickness of the etching stopper layer 22 is made negligibly smaller than the size of the electrophoresis display element 4 (diameter of the microcapsule 9; for example, 40 μm). As a result, even when a panel structure in which the etching stopper layer 22 is interposed between the TFT substrate 6 and the electrophoresis display element film 18 is used, the electrophoresis display element 4 is well driven and controlled. Accordingly, the display device according to this structural example has advantages of which a step for removing the etching stopper layer 22 can be omitted and the manufacturing method can be simplified.

Additionally, in such panel structure, even if the etching stopper layer 22 whose thickness is negligibly smaller than the size of the electrophoresis display element 4 is left without removing it, a voltage for driving and controlling the electrophoresis display element 4 does not vary largely. Therefore, the display device according to this structural example has advantages of which a withstand voltage of a circuit can be set to a low voltage because a high voltage is not necessary to drive the display device. Further, in this structural example and the manufacturing method, the explanation of the structure in which the etching stopper layer 22 is left without removing it has been made. The present invention is not limited to this and may include a step in which the thickness of the etching stopper layer 22 is reduced or the etching stopper layer 22 is completely removed.

<Operation of a Display Device>

Next, a schematic operation of a display device (electronic paper display device) having the display panel according to the second to fourth exemplary embodiments mentioned above will be described.

As described in a background art mentioned above, the operation state (image display state) in the display panel having the panel structure mentioned above can be roughly categorized into two, that are the image update state and the image non-update state.

(Image Update State)

In the image update state, by controlling a difference (electric potential difference) between the voltage applied to the pixel electrode 14 on the TFT substrate 6 side (the pixel potential) and the counter potential applied to the counter electrode 2 on the counter substrate 3 side, the electrophoresis display element 4 that is a display medium is driven to display a desired image.

Namely, in each of the exemplary embodiments mentioned above, a voltage applied to the gate wiring and the data wiring is set according to the image to be displayed and the predetermined pixel potential is applied to the pixel electrode 14 by turning on/off the TFT 5. Here, the pixel potential to be applied is a higher or lower voltage than the counter potential (reference potential) applied to the counter electrode 2. According to this voltage, the white particle 10 and the black particle 11 in each microcapsule 9 of the electrophoresis display element 4 move to the counter electrode 2 side or the pixel electrode 14 side. Accordingly, the microcapsule 9 corresponding to each display pixel is set to a white display state or a black display state and the desired image is displayed.

Here, a case in which a black color is displayed by a display pixel at the time of the image update state will be described specifically. First, in each exemplary embodiment mentioned above, for example, in a state in which a voltage (data voltage) of +15 volts is applied to the data wiring as a black display voltage, a pulse voltage (gate signal) of +25 volts is applied to the gate electrode of the TFT 5 via the gate wiring as the gate voltage of the selection level. As a result, the TFT 5 is turned on (ON operation) and the voltage (data voltage=+15 V) of the above-mentioned data wiring is applied to the pixel electrode 14 as the pixel voltage. After that, when the gate voltage is set to a voltage of −25 volts that is of a non-selection level, the TFT 5 is turned off (OFF operation). Further, when a white color is displayed by the display pixel, the TFT 5 is turned on in the state in which by the voltage of −15 volts is applied to the data wiring as a white display voltage in place of the above-mentioned black display voltage (+15 V). Accordingly, the data voltage is applied to the pixel electrode 14 as the pixel voltage.

Here, for example, a ground potential (0V) is applied to the counter electrode 2 which is provided so as to face the pixel electrode 14 of each display pixel as the counter potential (reference potential). According to the electric potential difference between the pixel potential of the pixel electrode 14 and the counter potential of the counter electrode 2, the negatively charged white particle 10 in the microcapsule 9 of the electrophoresis display element 4 moves to the pixel electrode 14 side to which the positive voltage (+15V) is applied. As a result, the black particle 11 can be viewed from the viewing side (for example, the upper side of FIG. 1) via the plastic substrate 1 of the counter substrate 3 and the black display state is set. Further, when a negative voltage (−15V) is applied to the pixel electrode 14, the positively charged black particle 11 in the microcapsule 9 of the electrophoresis display element 4 moves to the pixel electrode 14 side. As a result, the white particle 10 can be viewed from the viewing side via the plastic substrate 1 of the counter substrate 3 and the white display state is set.

The black display state or the white display state is set for each display pixel to display the desired image in the display panel.

(Image Non-Update State)

Because the electrophoresis display element 4 which can be applied to the electronic paper display device has a memory capability, when an image displayed by the image update operation mentioned above is held or when the image is not updated, it is not necessary to apply a voltage to each pixel electrode 14 of the display panel. In particular, the display panel shown in each exemplary embodiment mentioned above has the panel structure in which the counter electrode 2 is electrically connected to the conductive adhesive layer 15 or the shield electrode 16 that configures the electric field shielding layer when at least the display device is in the image non-update state. Therefore, in the display panel of each exemplary embodiment mentioned above, the static electricity generated on the surface of the plastic substrate 8, the charge up in plastic substrate 8, and the charge up in the conductive adhesive layer 15 that exists at the boundary between the glass substrate 7 and the plastic substrate 8 or between the TFT layer 26 and the plastic substrate 8 are suppressed.

Here, in case of a structure in which the counter electrode 2 is not electrically connected to the electric field shielding layer (conductive adhesive layer 15 or shield electrode 16), the electric potential of the counter electrode 2 is different from the electric potential of the electric field shielding layer. In this case, as described in "problem to be solved" and "analysis of image degradation phenomenon" mentioned above, because an unnecessary electric field is applied to the electrophoresis display element 4 at the time of image non-update, a problem of image deterioration occurs and a display state of a white or black color changes.

In contrast, in the display panel described in each exemplary embodiment mentioned above, when at least a display device is in the image non-update state, because the counter electrode 2 is electrically connected to the electric field shielding layer so that those have the same electric potential, a phenomenon in which an unnecessary electric field is generated can be prevented.

As described above, the display device according to each exemplary embodiment mentioned above has a structure in which the electric field shielding layer is interposed between the TFT layer of which the TFT substrate is composed and the plastic substrate and when at least a display device is in the image non-update state, the electric field shielding layer and the counter electrode have the same electric potential. Therefore, the generation of the static electricity on the surface of the plastic surface is prevented and the charge up of the plastic substrate and the adhesive layer caused by a direct current electric field from the various wirings arranged in the TFT layer is suppressed. Accordingly, the display device according to each exemplary embodiment mentioned above has advantages of which degradation of a displayed image at the time of non display drive can be prevented, an image display state can be held well, and a display device having excellent reliability can be realized. In the display device according to each exemplary embodiment mentioned above, a large storage capacity can be formed by using the electric field shielding layer as the storage capacity electrode for holding a storage capacity in each display pixel. Accordingly, the display device according to each exemplary embodiment mentioned above has advantages of which the drive ability of the electrophoresis display element can be improved and a high aperture ratio can be achieved.

Further, in each exemplary embodiment mentioned above, the explanation of the structure in which the counter electrode 2 is electrically connected to the conductive adhesive layer 15 or the shield electrode 16 that is the electric field shielding layer, or the storage capacity electrode 19 so that those have the same electric potential when at least a display device is in the image non-update state has been made. The present invention is not limited to this. Namely, in each exemplary embodiment mentioned above, it is desirable that not only the electric potential of the counter electrode 2 and the electric field shielding layer but also the data voltage applied to the data wiring and the gate voltage applied to the gate wiring are set to the same value. Moreover, it is desirable that the electric potentials of those are set to the ground potential (0V).

In the display device according to each exemplary embodiment mentioned above, the explanation of the structure in which a technical idea according to the present invention is applied to the display panel using the electrophoresis display element has been made. However, the present invention is not limited to this. Namely, the technical idea according to the present invention can also be applied to another display element with a memory capability, for example, a display panel using an electronic powder fluid, a cholesteric liquid crystal or the like.

In each exemplary embodiment mentioned above, the explanation of the display device having a panel structure for a monochrome display which displays an image in two colors of black and white has been made. However, the present invention is not limited to this. Namely, the technical idea according to the present invention may be applied to a display device having a panel structure for a color display.

FIG. 11 is a schematic cross sectional view showing a panel structure for a color display although FIG. 2 is a schematic cross sectional view showing a panel structure for a monochrome display.

Namely, the display device according to the present invention shown in FIG. 11 has a structure in which color filter substrate 23 is attached to another surface side (that is an upper side in the drawing; viewing side) of the counter substrate 3 in a panel structure of the second exemplary embodiment shown in FIG. 2. Here, the color filter substrate 23 has a structure in which a color filter 24 is stacked to a plastic substrate 28. A filter portion of each color, that is red (R), green (G) and blue (B), of the color filter 24 is arranged so as to correspond to each display color of a display pixel arranged in the TFT substrate 6. A transparent adhesive layer 29 is interposed between the plastic substrate 1 of the counter substrate 3 and the color filter 24 of the color filter substrate 23 to join them.

Fifth Exemplary Embodiment

Next, a fifth exemplary embodiment of a display panel which can be applied to a display device according to the present invention will be described with reference to a drawing.

A problem of image deterioration caused by electrostatic charge on the surface of the plastic substrate at the time of image update that is described in "problem to be solved" and "analysis of image degradation phenomenon of an active matrix type display device with a memory capability at the time of image non-update" occurs similarly when a colored electronic paper display device is used. Accordingly, for example, as shown in FIG. 11, the technical idea of the present invention can be applied to the display device having a panel structure for a color display which uses the color filter 24. As a result, the problem of degradation of a displayed image (disturbance of an image or deterioration in image quality) can be prevented well like each exemplary embodiment mentioned above.

By the way, the result of the verification performed by the inventor of the present application shows that a new problem that does not occur in a case of a monochrome display panel shown in each exemplary embodiment mentioned above occurs when a colored display device is used. Specifically, that is a problem of alignment of a color filter and a TFT substrate.

<Analysis of a Problem of a Colored Display Device>

The result of the verification of this new problem will be described in detail below.

An electrophoresis display element that is marketed and can be purchased in the market at present (corresponding to the electrophoresis display element film 18 mentioned above) is provided with a film-like material or a sheet-like material whose thickness is 100 to 200 μm. When a display panel for a color display is produced by using such electrophoresis display element, for example, as shown in FIG. 11, a panel structure in which the TFT substrate 6, the electrophoresis display element film 18 and the color filter substrate 23 are stacked in order is used.

Here, in such display panel, in order to set a display color for each display pixel, a manufacturing step in which the color filter substrate 23 and the TFT substrate 6 are pasted together via the electrophoresis display element film 18 with higher alignment accuracy (position adjustment) is required. In particular, when the electrophoresis display element film 18 and the color filter substrate 23 that are a display medium are formed of a film-like material, a manufacturing step in which the two film-like materials are pasted together with much higher alignment accuracy is required. However, usually, it is very difficult to paste the two film-like materials together with higher alignment accuracy by using a simple method. An appropriate and good manufacturing method has not been developed yet.

The plastic substrate 1 of which the electrophoresis display element film 18 is composed is generally formed of a film material such as polyethylene terephthalate (PET) or the like which has extremely low heat resistance. In contrast, a heat treatment process is essential to form the TFT 5 and the color filter 24. Therefore, a high heat resistant plastic substrate in which a glass filler with small expansion and contraction by heat is contained is used for the plastic substrates 8 and 28 of which the TFT substrate 6 and the color filter substrate 23 are composed.

Specifically, a rate of thermal expansion of polyethylene terephthalate used for the plastic substrate 1 of the electrophoresis display element film 18 is about $20 \times 10^{-6}$/K to $50 \times 10^{-6}$/K (20 to 50 ppm/° C.). In contrast, the rate of thermal expansion of a high heat resistant plastic used for the plastic substrates 8 and 28 of the TFT substrate 6 and the color filter substrate 23 is about $0.1 \times 10^{-6}$/K to 3 or $4 \times 10^{-6}$/K (0.1 to several ppm/° C.). Therefore, even if the TFT substrate 6 and the color filter substrate 23 are pasted together with higher alignment accuracy while sandwiching the electrophoresis display element film 18 between them, a problem of an alignment shift occurs by the difference in the rate of thermal expansion mentioned above. By deflection of the TFT substrate 6, the color filter substrate 23 or the electrophoresis display element film 18, peeling between them, or the like caused by heat generated in a heat treatment process performed after the above-mentioned pasting work, heat generated during operation of an actual product or the like, the above mentioned problem occurs.

In order to solve the problem of the alignment shift, for example, a method with which the electrophoresis display element 4 is directly formed on the one surface side of the color filter substrate 23 may be used. In this method, the above-mentioned alignment process between the electrophoresis display element film 18 and the color filter substrate 23 can be omitted substantially and the color filter substrate having electrophoresis display elements and the TFT substrate 6 can be pasted together with higher alignment accuracy. However, even when this method is employed, a problem of which the alignment shift occurs in a manufacturing process after this process or during actual operation cannot be solved.

For example, a method disclosed in Japanese Patent Application Laid-Open No. 2006-171735 is known as a related technology which can solve the problem of the alignment accuracy which arises when the above mentioned film-like materials are pasted together. A method for forming a display device with which a color filter is integrally formed on an electronic back plate having flexibility on which the TFT or the like is formed and a counter electrode is pasted on it via an electrophoresis device (display medium) is disclosed in Japanese Patent Application Laid-Open No. 2006-171735. Further, in this display device, a displayed image is viewed from the outside of the electronic back plate side. However, a problem of image deterioration caused by electrostatic charge of a substrate when the electronic paper display device is in the image non-update state is not described in Japanese Patent Application Laid-Open No. 2006-171735.

An example of a technology with which a flexible liquid crystal display device is formed by pasting a TFT substrate to a film-like color filter substrate by transfer is disclosed in patent document 3 shown in background art mentioned above. However, in an ordinary liquid crystal display device disclosed in patent document 3, a display element has no memory capability. Therefore, when the electronic paper display device is in the image non-update state, the problem of image deterioration caused by electrostatic charge on a substrate does not occur. Accordingly, by using the technology disclosed in these official bulletins, the problem of image deterioration when the electronic paper display device is in the image non-update state and the problem of the alignment shift between the color filter substrate and the TFT substrate mentioned above can not be solved at the same time.

Accordingly, the fifth exemplary embodiment of the present invention discloses a panel structure for a colored electronic paper display device in which a color filter substrate and a TFT substrate can be pasted together with higher alignment accuracy by using a simple manufacturing process.

First Structural Example

Figure 12:
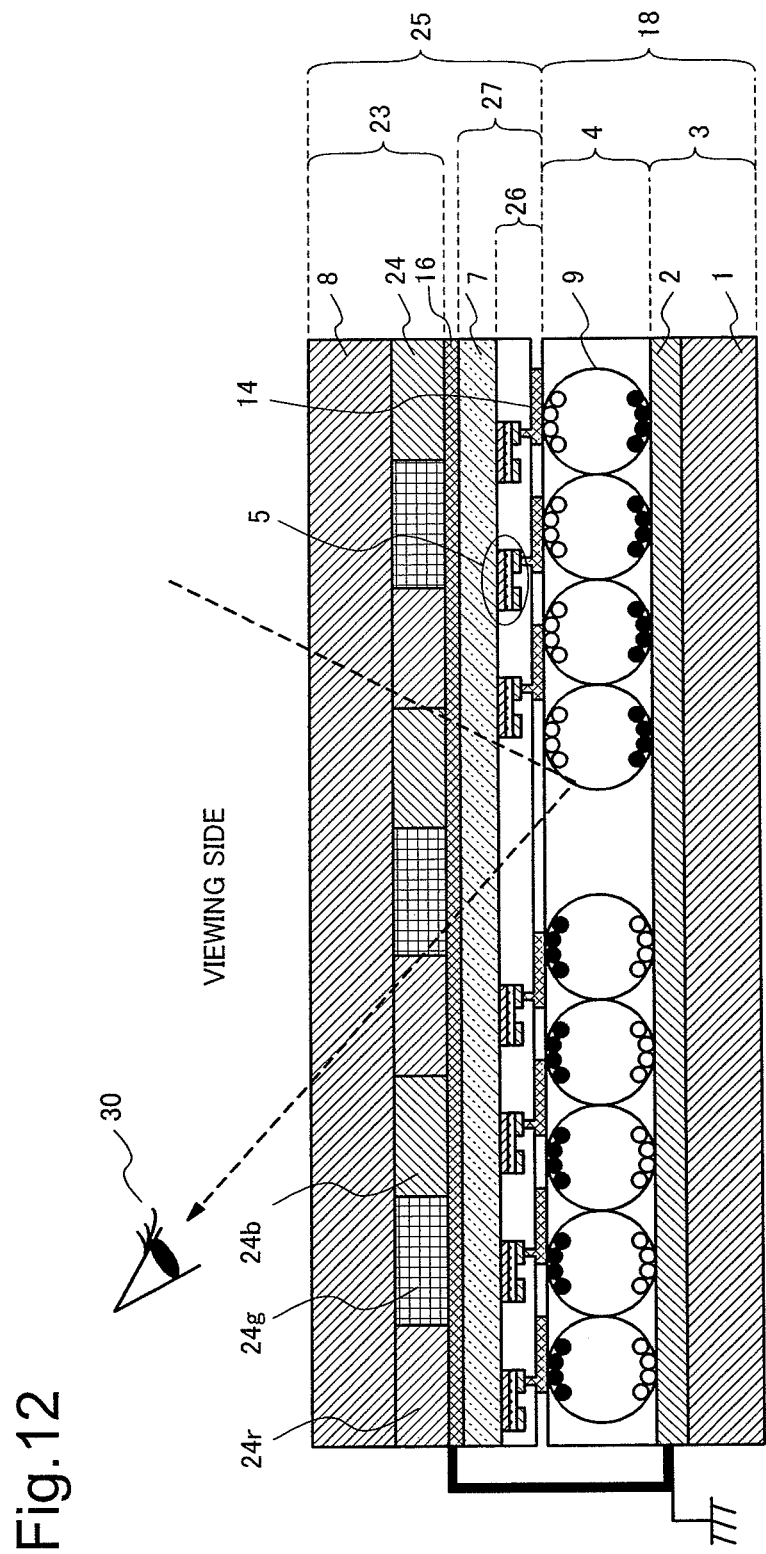
FIG. 12 is a schematic cross sectional view showing a first structural example of the display panel according to the fifth exemplary embodiment.

FIG. 12 is a schematic cross sectional view showing a first structural example of a display panel according to the fifth exemplary embodiment. Here, in the figure, the same reference numbers are used for the same structure as the panel structure shown in the second to fourth exemplary embodiments mentioned above and the description thereof will be simplified or omitted.

As shown in FIG. 12, the first structural example of the display panel according to this exemplary embodiment has a panel structure in which the structure of the second structural example of the second exemplary embodiment mentioned above is turned upside down and in place of the TFT substrate 6, a color filter substrate having TFTs 25 is provided.

Namely, the display panel according to this structural example has a panel structure in which the counter substrate 3, the microcapsule type electrophoresis display element 4 and the color filter substrate having TFTs 25 are stacked. The material in which the counter substrate 3 and the electrophoresis display element 4 are stacked forms the electrophoresis display element film 18 like the second exemplary embodiment mentioned above.

The color filter substrate having TFTs 25 has a structure in which the TFT glass substrate 27 in which the TFT layer 26 is provided on the glass substrate 7, the shield electrode 16, the color filter 24 and the plastic substrate 8 are stacked in order. Here, the material in which the color filter 24 and the plastic substrate 8 are stacked forms the color filter substrate 23.

The glass substrate 7 is thinly etched so as to have flexibility like the second exemplary embodiment mentioned above. This structural example has a structure in which the TFT layer 26 having the TFT 5 that operates as the pixel switch, the various wirings 5z, the pixel electrodes 14 or the like is provided on one surface side (that is a lower side in the drawing) of the glass substrate 7. Here, a gate electrode, a source electrode, and a drain electrode of the TFT 5, a gate wiring and a data wiring are formed of for example, a metal material. On the other hand, the pixel electrode 14 is formed of a transparent conductive film material such as ITO or the like.

This structural example has a structure in which the shield electrode 16 is provided to another surface side (that is an upper side in the drawing) of the glass substrate 7 and in a region corresponding to a display region of a display panel. Here, the shield electrode 16 is a single planar electrode which is formed of a transparent conductive film material such as ITO or the like and to which patterning is not performed in a region corresponding to all the pixel electrodes which are two-dimensionally arranged. As schematically shown in FIG. 12, when at least a display device (display panel) is in the image non-update state, the shield electrode 16 is electrically connected to the counter electrode 2 or a ground line so that those have the same electric potential. Here, in this structural example, for example, a conductive paste, a wiring or the like can be used for a conductive path for connecting the shield electrode 16 with the counter electrode 2 or the ground line.

The color filter 24 has a structure in which a filter portion for three colors of red (R), green (G) and blue (B) is arranged on one surface side (that is a lower side in the drawing) of the plastic substrate 8 containing a glass filler with small thermal expansion coefficient so as to correspond to a display color for each display pixel. A black matrix (not shown) is arranged in a boundary region among those colors of the color filter 24. Such color filter 24 is provided in another surface side (that is an upper side in the drawing) of the glass substrate 7 via the shield electrode 16 mentioned above.

In such panel structure, as shown in FIG. 12, the outside (that is an upper side of the drawing) of the plastic substrate 8 of the color filter substrate having TFTs 25 is a viewing side. Namely, an observer 30 views a display of the electrophoresis display element 4 via the color filter substrate having TFTs 25 (the color filter substrate 23 and the TFT glass substrate 27) from the outside of the plastic substrate 8 of the color filter substrate having TFTs 25. Here, the TFT 5, the various wirings 5z and the like of which the TFT layer 26 of the TFT glass substrate 27 is composed are formed of for example, an opaque electrode layer and wiring layer using a metal material. Therefore, in this structural example, it is desirable to arrange the TFT 5 and the various wirings 5z at the position (a region in which the TFT 5 and the like and the black matrix overlap in plane view when viewing from the viewing side) corresponding to the region in which the black matrix is arranged. As a result, in the panel structure according to this structural example, intercept of a light which is inputted from the viewing side, reflected by the electrophoresis display element 4 and radiated to the viewing side again can be largely avoided. Accordingly, a display device according to this structural example has advantages of which a high aperture ratio can be achieved Thus, this structural example has a panel structure in which the TFT glass substrate 27 including the glass substrates 7 and the color filter substrate 23 including the plastic substrate 8 whose thermal expansion coefficients are approximately equal to each other are pasted together via the shield electrode 16 formed of the conductive film material such as ITO or the like. As a result, in this structural example, occurrence of deflection, peeling or the like by heat generated in a heat treatment step of a manufacturing process after a work for pasting the TFT glass substrate 27 and the color filter substrate 23 together or heat generated during operation of an actual product or the like can be suppressed. Accordingly, the display device according to this structural example has advantages of which occurrence of the alignment shift due to the difference in the rate of thermal expansion mentioned above can be prevented.

This structural example has a panel structure in which the shield electrode 16 which functions as an electric field shielding layer is provided between the TFT glass substrate 27 and the color filter substrate 23. Moreover, in this structural example, when at least a display device (display panel) is in the image non-update state, the counter electrode 2 of the counter substrate 3 is electrically connected to the shield electrode 16 so that those have the same electric potential. As a result, in this structural example, because the color filter 24 is in contact with the shield electrode 16 directly, the static electricity generated on the color filter 24 is discharged by the counter potential and the charge up is prevented. In this structural example, the direct current electric field from the gate wiring or the like is shielded like each exemplary embodiment mentioned above. Accordingly, the display device according to this structural example has advantages of which a problem of image deterioration can be solved and reliability of the electronic paper display device can be improved.

In this structural example, because the shield electrode 16 can function as the storage capacity electrode, a fixed storage capacity can be held between each pixel electrode 14 and the shield electrode 16. Accordingly, the display device according to this structural example has advantages of which a high aperture ratio can be achieved.

Second Structural Example

FIG. 13 is a schematic cross sectional view showing a second structural example of a display panel according to the fifth exemplary embodiment. Here, in the figure, the same reference numbers are used for the same structure as the panel structure shown in each exemplary embodiment mentioned above and the description thereof will be simplified or omitted.

In the first structural example mentioned above, the explanation of the panel structure in which the shield electrode 16 is arranged between the glass substrate 7 and the color filter 24 has been made. However, the present invention is not limited to this.

Namely, for example, as shown in FIG. 13, the second structural example of the display panel according to this exemplary embodiment has a panel structure in which the color filter substrate having TFTs 25 is formed by pasting the TFT glass substrate 27 and the color filter substrate 23 together directly. The color filter substrate 23 has a structure in which the color filter 24, the shield electrode 16 and the plastic substrate 8 are stacked in order. Namely, this structural example has a panel structure in which the shield electrode 16 is arranged between the plastic substrate 8 and the color filter 24.

Here, this structural example has a panel structure in which the TFT glass substrate 27 including the glass substrates 7 and the color filter substrate 23 including the plastic substrate 8 whose thermal expansion coefficients are approximately equal to each other are pasted together directly. As a result, in this structural example, occurrence of deflection, peeling or the like by heat generated in a heat treatment step after a work for pasting the TFT glass substrate 27 and the color filter substrate 23 together or heat generated during operation of an actual product or the like can be suppressed. Accordingly, the display device according to this structural example has advantages of which occurrence of the alignment shift due to the difference in the rate of thermal expansion mentioned above can be prevented.

In this structural example, the plastic substrate 8 and the color filter 24 are in contact with the shield electrode 16 directly. As a result, in this structural example, the static electricity generated on the plastic substrate 8 and the color filter 24 is discharged by the counter potential via the shield electrode 16 and the charge up is prevented. Accordingly, the display device according to this structural example has advantages of which image deterioration can be suppressed and reliability of the electronic paper display device can be improved.

Further, in each structural example according to this exemplary embodiment, the explanation of the structure in which the shield electrode 16 formed of a transparent conductive film material such as ITO or the like is provided as an electric field shielding layer has been made. The present invention is not limited to this and a structure in which a conductive adhesive layer formed of a transparent conductive paste is provided may be used.

(Manufacturing method) next, a method for manufacturing a display panel having the panel structure mentioned above will be described with reference to a drawing.

FIGS. 14A to 14D are sectional views illustrating examples of steps of method for manufacturing a display panel according to the fifth exemplary embodiment. Here, in the figure, the explanation of the same process as the manufacturing method (refer to FIG. 4) shown in the second exemplary embodiment mentioned above will be simplified.

In a method for manufacturing a display panel having the first structural example mentioned above, first, the TFT layer 26 is formed on the one surface side (that is an upper side in the drawing) of the glass substrate 7 as shown in FIG. 14A like the manufacturing method shown in the second exemplary embodiment mentioned above. After that, the protective film 17 is pasted so as to be in contact with each pixel electrode 14 of the TFT layer 26.

Next, as shown in FIG. 14B, by placing this TFT glass substrate 27 in an etching solution, the another surface side (that is a lower side in the drawing) of the glass substrate 7 is etched. Here, the glass substrate 7 is etched so as to obtain the desired thickness that is, for example, more than 0 (zero) and not greater than 300 μm based on the etching rate of the glass substrate 7 that is measured in advance.

Figure 14C:
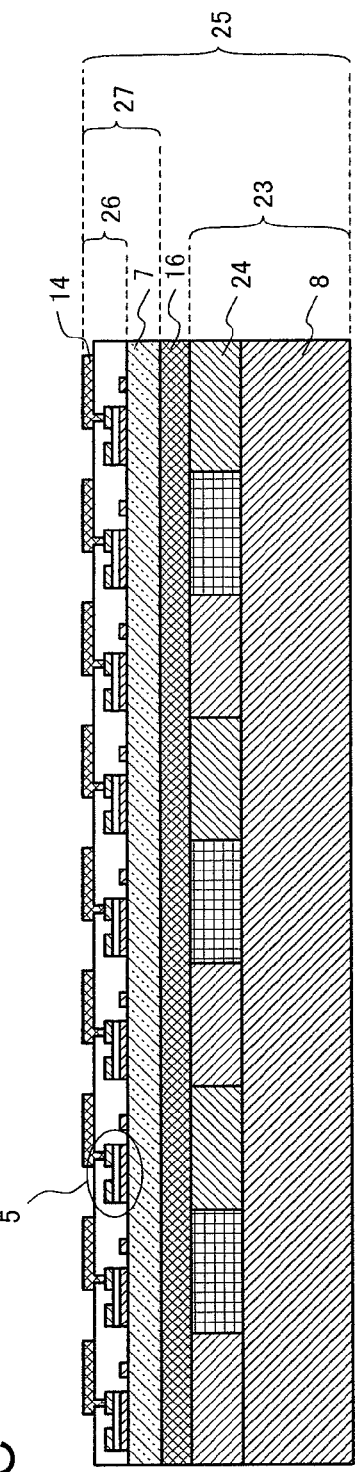
FIG. 14C is a cross sectional view illustrating an example of a third step of the method for manufacturing the display panel according to the fifth exemplary embodiment.

Next, the shield electrode 16 that is formed of a transparent conductive film material such as ITO or the like and functions as the electric field shielding layer is formed on the whole etching surface (that is a lower side in the drawing) of the glass substrate 7. Next, a filter portion of each color, that is red (R), green (G) and blue (B), of the color filter substrate 23 is exactly arranged so as to correspond to each display color for each display pixel. Namely, the color filter 24 side of the color filter substrate 23 is pasted on the surface of the TFT glass substrate 27 with higher alignment accuracy. Here, the arrangement of each display color for each display pixel is the same as the arrangement of each pixel electrode 14 formed on the TFT glass substrate 27 like the exemplary embodiment mentioned above. Next, the protective film 17 pasted on one surface side of the TFT glass substrate 27 is peeled off. As a result, as shown in FIG. 14C, the devices such as the TFT 5 and the like are transferred from the protective film 17 side to the color filter substrate 23 side and the color filter substrate having TFTs 25 is produced.

Figure 14D:
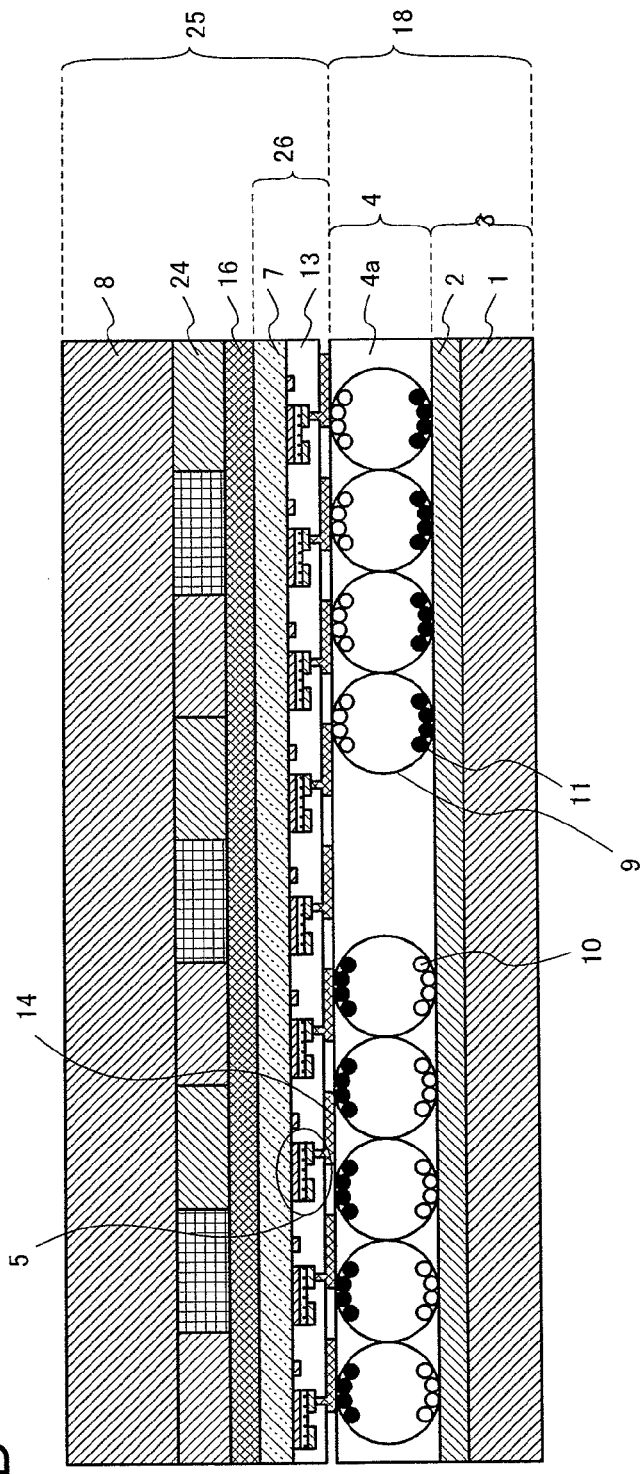
FIG. 14D is a cross sectional view illustrating an example of a fourth step of the method for manufacturing the display panel according to the fifth exemplary embodiment.

Next, as shown in FIG. 14D, the color filter substrate having TFTs 25 is turned upside down and the electrophoresis display element film 18 is pasted on one surface side (that is a lower side in the drawing) of the color filter substrate having TFTs 25. Here, the electrophoresis display element film 18 is pasted so that the electrophoresis display element 4 is in contact with one surface side of the color filter substrate having TFTs 25 with proper (arbitrary) alignment accuracy. As a result, the pixel electrode 14 is arranged so as to face the counter electrode 2 via the electrophoresis display element 4. Further, after this step or in parallel with this step, means for electrically connecting the shield electrode 16 formed on the color filter substrate having TFTs 25 side and the counter electrode 2 on the electrophoresis display element film 18 (counter substrate, 3) side is formed. Specifically, when at least a display device (display panel) is in the image non-update state, a wiring and switching means for electrically connecting the above-mentioned shield electrode 16 and the counter electrode 2 are formed appropriately. Accordingly, the display panel having a panel structure shown in FIG. 12 is produced.

As described above, in the manufacturing method according to this exemplary embodiment, the TFT glass substrate 27 in which the TFT layer 26 is formed on the thinly etched glass substrate 7 produced in advance and the color filter substrate 23 are pasted together directly with higher alignment accuracy. On the other hand, when the electrophoresis display element film 18 is pasted to the TFT layer 26, the work can be performed without higher alignment accuracy. Accordingly, after the work is performed with relatively low alignment accuracy, the TFT layer 26 and the electrophoresis display element film 18 are pasted together.

In such display device and the method for manufacturing thereof, a display panel in which a position adjustment between a display color for each display pixel and the filter portion of each color of the color filter 24 can be exactly performed and the substrates whose thermal expansion coefficients are approximately equal to each other are pasted together can be realized by a simple manufacturing method. As a result, a problem which occurs in a panel structure as shown in FIG. 11 can be solved. Namely, the display device according to this exemplary embodiment has advantages of which a problem of the alignment accuracy which arises when the display panel is produced and a problem of the alignment shift due to the difference in the thermal expansion coefficient of the substrates can be solved.

Further, in this exemplary embodiment, an explanation of a manufacturing method of the colored display device having a panel structure including the thin glass substrate 7 has been made like the second and third exemplary embodiments mentioned above. However, the present invention is not limited to this. This exemplary embodiment can be suitably applied to a case in which a color display device is produced by using a panel structure in which the glass substrate 7 is completely removed as described in the fourth exemplary embodiment.

(Applications)

FIG. 15 is a schematic cross sectional view showing an example of applications to which a display device according to the present invention is applied. Here, in the figure, the same reference numbers are used for the same structure as the panel structure shown in the second to fifth exemplary embodiments mentioned above and the description thereof will be omitted.

The display device according to the present invention is not limited to the embodiment of the electronic paper display device shown in the second to fifth exemplary embodiments mentioned above, and it can be applied to various applications. For example, the display device according to the present invention may be applied to a structure in which in the panel structure (refer to FIG. 2) shown in the second exemplary embodiment mentioned above, input means is provided on another surface side (that is an upper side in the drawing; viewing side) of the plastic substrate 1 of which the counter substrate 3 is composed as shown in FIG. 15. Here, in the present invention, for example, a pen input unit, a touch panel 31 or the like can be used as the input means which can be provided on the surface of the viewing side of the counter substrate 3 for inputting data of desired image information by touching the input means directly.

In the present invention, in such panel structure, even when a display of the display device is continuously performed for a long time period for the image update, the electric field shielding layer formed of the conductive adhesive layer 15 is electrically connected to the counter electrode 2 so that those have the same electric potential or those are connected to a ground potential. Accordingly, by applying the technical idea of the present invention to a display device having such panel structure, a problem of image deterioration caused by electrostatic charge of a substrate can be effectively solved.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

What is claimed is:

1. A display device that displays information by controlling reflection and transmission of incident light from outside of the device constructed by facing a first substrate having a device layer which is formed to drive a plurality of display elements and a second substrate opposing said first substrate so as to sandwich said device layer in between said first and second substrates comprising:

said first substrate having said device layer which is stacked on an insulating substrate above a first conductive layer and on which a pixel electrode having a pixel switch connected with said device layer and wirings that are arranged so as to correspond to a plurality of display pixels; and said second substrate on which a second conductive layer is provided so as to face said pixel electrode arranged on said first substrate;

wherein a major part of a control signal cycle driving said display elements stays in an OFF state, and said first conductive layer and said second conductive layer are electrically connected and applied a specific electric potential such that an electric charge generated on the first conductor is discharged.

2. The display device according to claim 1, wherein the electric potential of said first conductive layer and the electric potential of said second conductive layer are set to the same value at the time of image non-update.

3. The display device according to claim 2, wherein said first conductive layer and said second conductive layer are connected to a ground potential at the time of image non-update.

4. The display device according to claim 1, wherein said first conductive layer is formed of a conductive adhesive material.

5. The display device according to claim 1, wherein said first conductive layer is formed of a conductive thin film electrode.

6. The display device according to claim 1, wherein said first conductive layer is a storage capacity electrode for holding a capacitive component between said pixel electrode of said device layer and the first conductive layer.

7. The display device according to claim 1, wherein said insulating substrate has flexibility.

8. The display device according to claim 1, wherein a plurality of display elements with a memory capability are arranged in said display element layer.

9. The display device according to claim 8, wherein said display element layer includes an electrophoresis display element.

10. The display device according to claim 1, wherein said first substrate or said second substrate includes a color filter.

11. The display device according to claim 1, wherein said display device comprises input means for inputting desired image data on a surface of said first substrate or said second substrate arranged on the viewing side of said display element layer.

12. The display device according to claim 1, wherein the first conductor layer is a shielding layer that prevents electric field induced by a voltage applied to the wirings of the plurality of display pixels from leaking to the first substrate layer.

* * * * *